(12) United States Patent
Nakamura

(10) Patent No.: US 9,009,847 B2
(45) Date of Patent: Apr. 14, 2015

(54) INFORMATION MANAGEMENT APPARATUS, INFORMATION MANAGEMENT SYSTEM, INFORMATION MANAGEMENT METHOD AND PROGRAM

(75) Inventor: Noriyasu Nakamura, Shizuoka (JP)

(73) Assignee: NEC Platforms, Ltd., Kanagawa (JP)

( * ) Notice: Subject to any disclaimer, the term of this patent is extended or adjusted under 35 U.S.C. 154(b) by 392 days.

(21) Appl. No.: 13/466,779

(22) Filed: May 8, 2012

(65) Prior Publication Data

US 2012/0291139 A1 Nov. 15, 2012

(30) Foreign Application Priority Data

May 9, 2011 (JP) ................................. 2011-104408

(51) Int. Cl.
*G06F 21/24* (2006.01)
*G06F 21/62* (2013.01)

(52) U.S. Cl.
CPC ...... *G06F 21/629* (2013.01); *G06F 2221/2111* (2013.01)

(58) Field of Classification Search
CPC G06F 21/629; G06F 2221/2111; G06F 21/00
USPC ...................... 726/4, 5, 26, 28; 709/219, 217; 348/211.2
See application file for complete search history.

(56) References Cited

U.S. PATENT DOCUMENTS

2009/0322890 A1* 12/2009 Bocking et al. ............ 348/211.2
2011/0209201 A1* 8/2011 Chollat ............................ 726/4

FOREIGN PATENT DOCUMENTS

| JP | 2000-165952 A | 6/2000 |
| JP | 2007233441 A | 9/2007 |
| JP | 2007241907 A | 9/2007 |
| JP | 2008191732 A | 8/2008 |
| JP | 2009253782 A | 10/2009 |
| JP | 2009268007 A | 11/2009 |

OTHER PUBLICATIONS

Office Action dated Dec. 3, 2013, issued by the Japan Patent Office in corresponding Japanese Application No. 2011-104408.
Office Action issued by the Japanese Patent Office dated May 14, 2013 in corresponding Application No. 2011-104408.

* cited by examiner

*Primary Examiner* — Brandon Hoffman
*Assistant Examiner* — Nega Woldemariam
(74) *Attorney, Agent, or Firm* — Sughrue Mion, PLLC

(57) ABSTRACT

An information management apparatus which can set an area in which use of a file is not allowed for each file separately is provided. The existing zone area information acquisition unit 61 acquires existing zone area information that is a condition set for each file and is information used for determination of whether a file is allowed to be used by being compared with a condition about an area in which use of a file is allowed or an area in which use of a file is forbidden. The determining unit 62 compares the existing zone area information and each condition set for each file, and determines whether each file to be a target of use by a user is allowed to be used or not.

10 Claims, 13 Drawing Sheets

Fig.4

AREA SETTING

SPECIFIC FILE A: USE-PERMITTED AREA = A

SPECIFIC FILE B: USE-PERMITTED AREA = B

SPECIFIC FILE C: USE-PERMITTED AREA = NOT LIMITED

EXECUTABLE FILE $\alpha$: USE-PERMITTED AREA = A

EXECUTABLE FILE $\beta$: USE-PERMITTED AREA = B

EXECUTABLE FILE $\gamma$: USE-PERMITTED AREA = NOT LIMITED

Fig.7
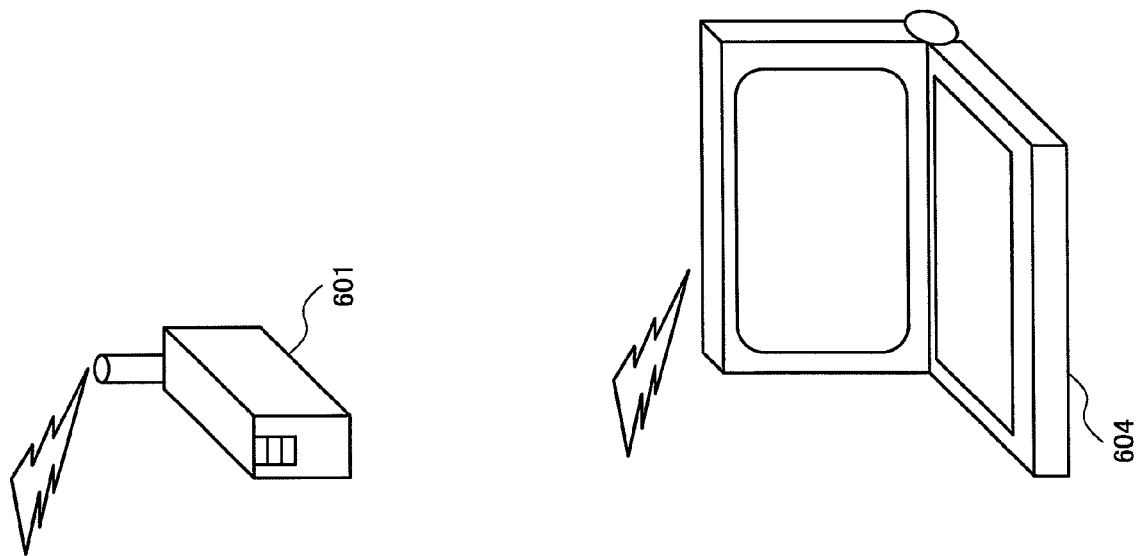
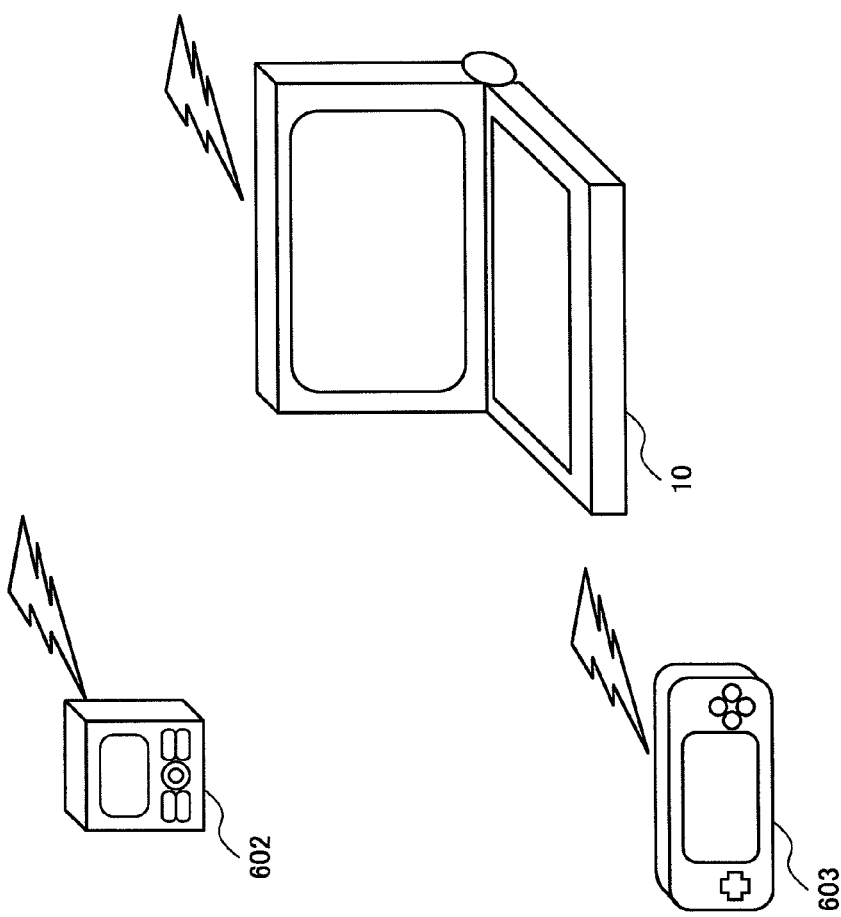

INFORMATION MANAGEMENT APPARATUS, INFORMATION MANAGEMENT SYSTEM, INFORMATION MANAGEMENT METHOD AND PROGRAM

This application is based upon and claims the benefit of priority from Japanese Patent Application No. 2011-104408, filed on May 9, 2011, the disclosure of which is incorporated herein in its entirety by reference.

TECHNICAL FIELD

The present invention relates to an information management apparatus, an information management system, an information management method and an information management program, and, more particularly, to an information management apparatus, an information management system, an information management method and an information management program which permit or forbid use of a file according to a user's location.

BACKGROUND ART

There is known a use control method for mobile phones which prevents wrongful use of a mobile phone using location information of the mobile phone (refer to patent document 1, for example). In the method disclosed in patent document 1, area information of an area where use of a mobile phone is permitted is stored in a memory of the mobile phone. The mobile phone recognizes the current location by obtaining necessary information from a control signal sent and received between a base station apparatus and itself. When the current location is within a use-permitted area, the mobile phone dials a designated line selection number according to user's operation. When the current location is outside the use-permitted area, even if the user operates the mobile phone, it issues a warning without transition to a dialing operation.

Also, in patent document 1, there is described that, when the current location is outside the use-permitted area, use of the entire functions of the mobile phone is forbidden, and, other than that, there is also described that only a receiving function, a telephone book display function and the like are selected individually and made unavailable.

Patent document 1J: apanese Patent. Application Laid-Open No. 2000-165952

In recent years, a notebook computer, a mobile terminal and an external recording medium such as a USB (Universal Serial Bus) memory are widely used due to their high transportability and user-friendliness. However, there is a case where such a notebook computer, a mobile terminal, an external recording medium or the like is stolen or lost, resulting in outflow of confidential information and personal information of a company.

A mobile phone described in patent document 1 can prevent outflow of information because its functions cannot be used when existing outside a use-permitted area.

However, a user uses a large variety of files. In a mobile phone described in the patent document 1, when a user is outside a use-permitted area, any files cannot be used any more. However, even if it is outside the use-permitted area, it is desirable to be permitted to use files which are permissible to be used.

In patent document 1, there is also described that, when a mobile phone exists outside a use-permitted area, only an individual function such as a receiving function, a telephone book display function or the like is selected and forbidden to be used. Thus, even if only a specific function is made unavailable, files related to that function cannot be used any more uniformly. For example, even when only a spreadsheet function of a mobile phone is made unavailable, spreadsheet files become unavailable uniformly. In reality, among the files which become unavailable uniformly, there can be files which are permissible to be used outside the use-permitted area. It is desirable to be permitted to use such files outside a use-permitted area.

SUMMARY

An exemplary object of the invention is to provide an information management apparatus, an information management system, an information management method and an information management program which can set an area (place) where a file cannot be used on a file-by-file basis separately.

An information management apparatus according to an exemplary aspect of the invention includes an existing zone area information acquisition unit which acquires existing zone area information which is a condition set for each file and is information used for determination of whether a file is allowed to be used by being compared with a condition about an area where use of a file is allowed or forbidden, a determining unit which determines whether each file to be a target of use by a user is allowed to be used by comparing the existing zone area information and each condition set for each file, and a file use control unit which, upon being determined each of files to be targets of use by a user is allowed to be used, permits use of each of the files, and, upon being determined some of files to be targets of use by a user are not allowed to be used, permits use of files besides the file not allowed to be used.

An information management system according to an exemplary aspect of the invention, includes a terminal apparatus including a condition input unit for accepting, on a file-by-file basis, information indicating an area to allow use of a file as a condition to permit use of a file, a database apparatus to receive the condition set for each file from the terminal apparatus and store the condition. The database apparatus includes a condition storage unit which stores the condition set for each file received from the terminal apparatus, an existing zone area information acquisition unit which acquires location information of the terminal apparatus as existing zone area information used for determination of whether a file is allowed to be used by being compared with the condition, a determining unit which determines whether each of files to be targets of use by a user is allowed to be used by comparing the existing zone area information and each condition set for each of the files, and, upon being determined each of the files to be targets of use by a user is allowed to be used, notifying to that effect to the terminal apparatus, and, upon being determined some of the files to be targets of use by a user are not allowed to be used, notifying the terminal apparatus of the file not allowed to be used. The terminal apparatus includes a file use control unit which, upon receiving the notification to the effect that each of the files is allowed to be used, permits use of each of the files, and, upon receiving the notification of the file not allowed to be used, permits use of files besides the file not allowed to be used among files to be targets of use by a user.

An information management method according to an exemplary aspect of the invention, includes the steps of acquiring existing zone area information which is a condition set for each file and being information used for determination of whether a file is allowed to be used by being compared with a condition about an area where use of a file is allowed or forbidden, determining whether each of files to be targets of use by a user is allowed to be used by comparing the existing zone area information and each condition set for each of the files, and upon being determined each of the files to be targets of use by a user is allowed to be used, permitting use of each of the files, and, upon being determined some of the files to be targets of use by a user are not allowed to be used, permitting use of files besides the file not allowed to be used.

An information management program according to an exemplary aspect of the invention makes a computer execute the proceedings of acquiring existing zone area information which is a condition set for each file and is information used for determination of whether a file is allowed to be used by being compared with a condition about an area where use of a file is allowed or forbidden, determining whether each of files to be targets of use by a user is allowed to be used by comparing the existing zone area information and each condition set for each of the files, and upon being determined each of the files to be targets of use by a user is allowed to be used, permitting use of each of the files, and, upon being determined some of the files to be targets of use by a user are not allowed to be used, permitting use of files besides the file not allowed to be used.

BRIEF DESCRIPTION OF THE DRAWINGS

Exemplary features and advantages of the present invention will become apparent from the following detailed description when taken with the accompanying drawings in which:

FIG. 4 is an explanatory drawing showing an example of files stored in a mobile terminal 10 and a use-permitted area which has been set to each of the files;

FIG. 7 is an explanatory drawing showing an example of peripheral devices that are arranged around the terminal apparatus 10, and can be designated by a user in a third exemplary embodiment;

EXEMPLARY EMBODIMENT

Next, a detailed explanation will be given for the first exemplary embodiment with reference to the drawings.

An information management apparatus of the present invention can be realized as a terminal apparatus (a notebook computer, a mobile phone or a mobile terminal, for example) having transportability and is equipped with a user interface, for example. Also, an information management apparatus of the present invention can also be realized as an external recording medium having transportability. In the following description, an information management apparatus of the present invention will be described taking the case where it is realized as a terminal apparatus having transportability as an example.

(The First Exemplary Embodiment)

Figure 1:
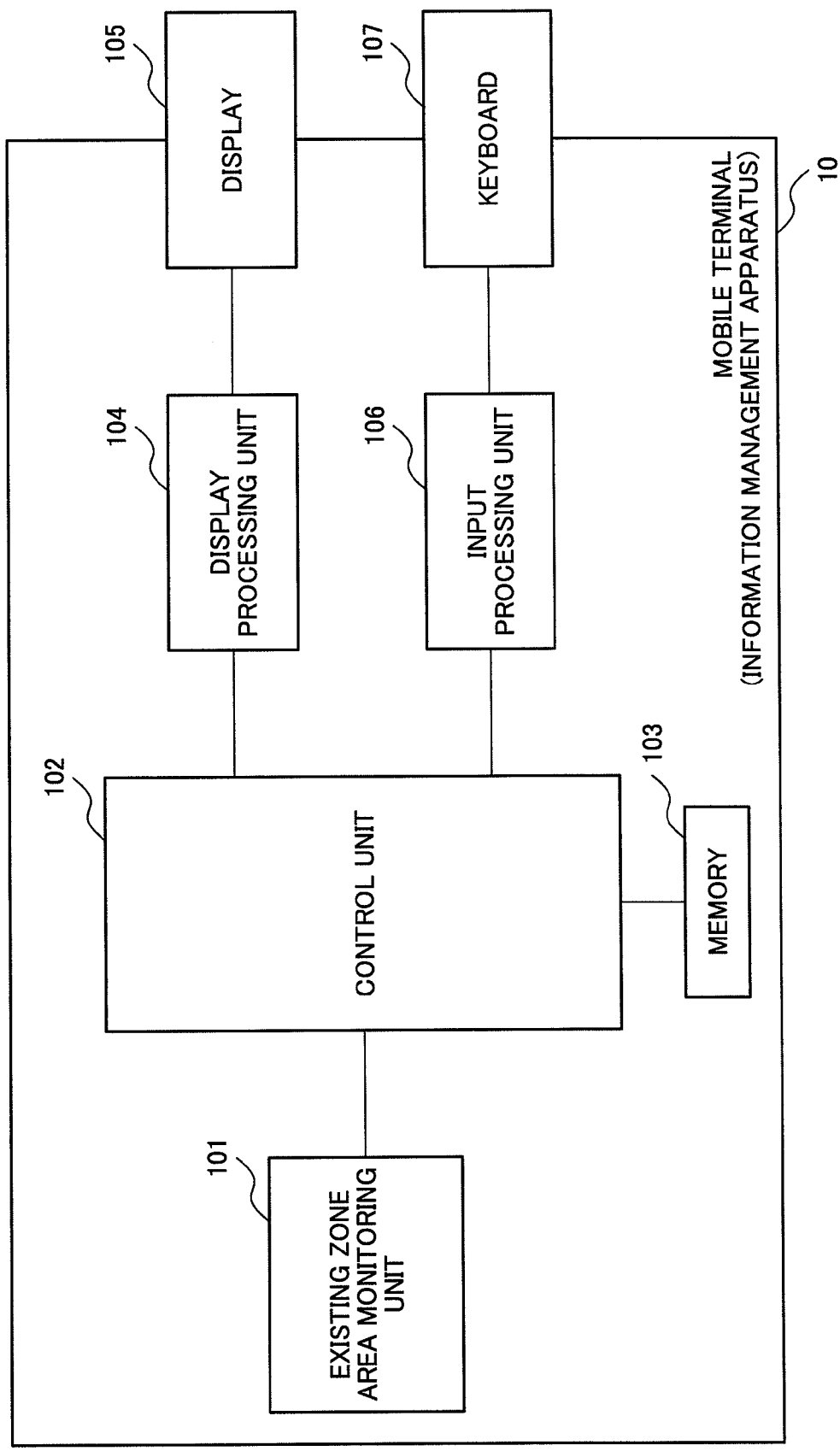
FIG. 1 is a block diagram showing an example of an information management apparatus of the present invention.

FIG. 1 is a block diagram showing an example of an information management apparatus of the present invention. In FIG. 1, although the case where an information management apparatus 10 is a mobile terminal is taken as an example, the information management apparatus 10 may be realized by a notebook computer or a mobile phone.

The mobile terminal (information management apparatus) 10 includes an existing zone area monitoring unit 101, a memory 103, a control unit 102, a display 105, a keyboard 107, a display processing unit 104 and an input processing unit 106.

The existing zone area monitoring unit 101 acquires existing zone area information, and inputs it to the control unit 102.

Here, a condition which has been determined by the user of the terminal apparatus 10 about an area (place) in which a file is allowed to be used or an area in which use of a file is forbidden is referred to as an existing zone judgment condition. An existing zone judgment condition is set for each file.

Existing zone area information which the existing zone area monitoring unit 101 acquires is information for determining whether a file is allowed to be used by comparing it with an existing zone judgment condition. For example, it is supposed that, as an existing zone judgment condition, an area which has been specified fixedly as a place where a file is allowed to be used is being set. In this case, as existing zone area information, location information which indicates a current location of the terminal apparatus 10 should be used. When location information and an existing zone judgment condition are compared, and the current location is included in an area which has been specified fixedly as a place where a file is allowed to be used, the file can be used.

Also, it is supposed that, as an existing zone judgment condition, a condition that a file can be used when identification information of a predetermined device designated by a user is received is being set, for example. This existing zone judgment condition does not specify a place where a file is allowed to be used fixedly, but it means that a file can be used when the terminal apparatus 10 exists in the range where it can communicate with a predetermined device designated by a user. Accordingly, even when the predetermined device moves, if the terminal apparatus 10 also moves together with the predetermined device, and the terminal apparatus 10 keeps existing in the range where it can communicate with the predetermined device, a state in which a file can be used continues. When such existing zone judgment condition is set, identification information received from a device in the neighborhood should be employed as existing zone area information. When identification information received from another device is the same as the identification information of the predetermined device set in the existing zone judgment condition, a file will be allowed to be used.

The memory 103 stores an existing zone judgment condition set by a user, an information management program (hereinafter, just referred to as an existing zone judgment application) and file management information. The memory 103 also stores various files which fall under personal data and security data or the like. Other management information may be stored in the memory 103. Also, in the memory 103, files which do not pose a problem even if it is shown to the public may be stored.

File management information is information which enumerates files which become targets of use by a user, and hereinafter, it is referred to as a FAT (File Allocation Table). Thus, in this description, a FAT means file management information.

According to this exemplary embodiment, a regular FAT and a pseudo-FAT are used as a FAT. A regular FAT is information which enumerates all files which become targets of use by a user. Such file is not limited to only a document file, but an executable file and a hidden file may be included. By making hidden files also be targets of use by a user, execution rights or the like of an application by the hidden files can be controlled. A pseudo-FAT is information which is made by eliminating some of files enumerated by a regular FAT.

The control unit 102 refers to a regular FAT or a pseudo-FAT to determine whether to allow a user to use a file or not. A file which is enumerated by a FAT to which the control unit 102 refers is a file available for a user. Accordingly, in the state that the control unit 102 refers to a regular FAT, the user can use each of files, and, in the state that the control unit 102 refers to a pseudo-FAT, restriction will occur on use of the files.

The control unit 102 manages a file in the mobile terminal 10 according to an existing zone judgment application. For example, the control unit 102 compares existing zone area information inputted from the existing zone area monitoring unit 101 and an existing zone judgment condition stored in the memory 103 according to an existing zone judgment application, and determines whether the user can use each file or not.

As a user interface, the display 105 indicates various images such as letters and charts.

The display processing unit 104 controls the display 105 based on display data outputted by the control unit 102, and displays an image on the display 105.

The keyboard 107 is an input device which is operated by a user, and from which optional data is inputted from the user.

The input processing unit 106 detects data inputted to the keyboard, analyzes the data and notifies the control unit 102 of the user's input content.

Figure 2:
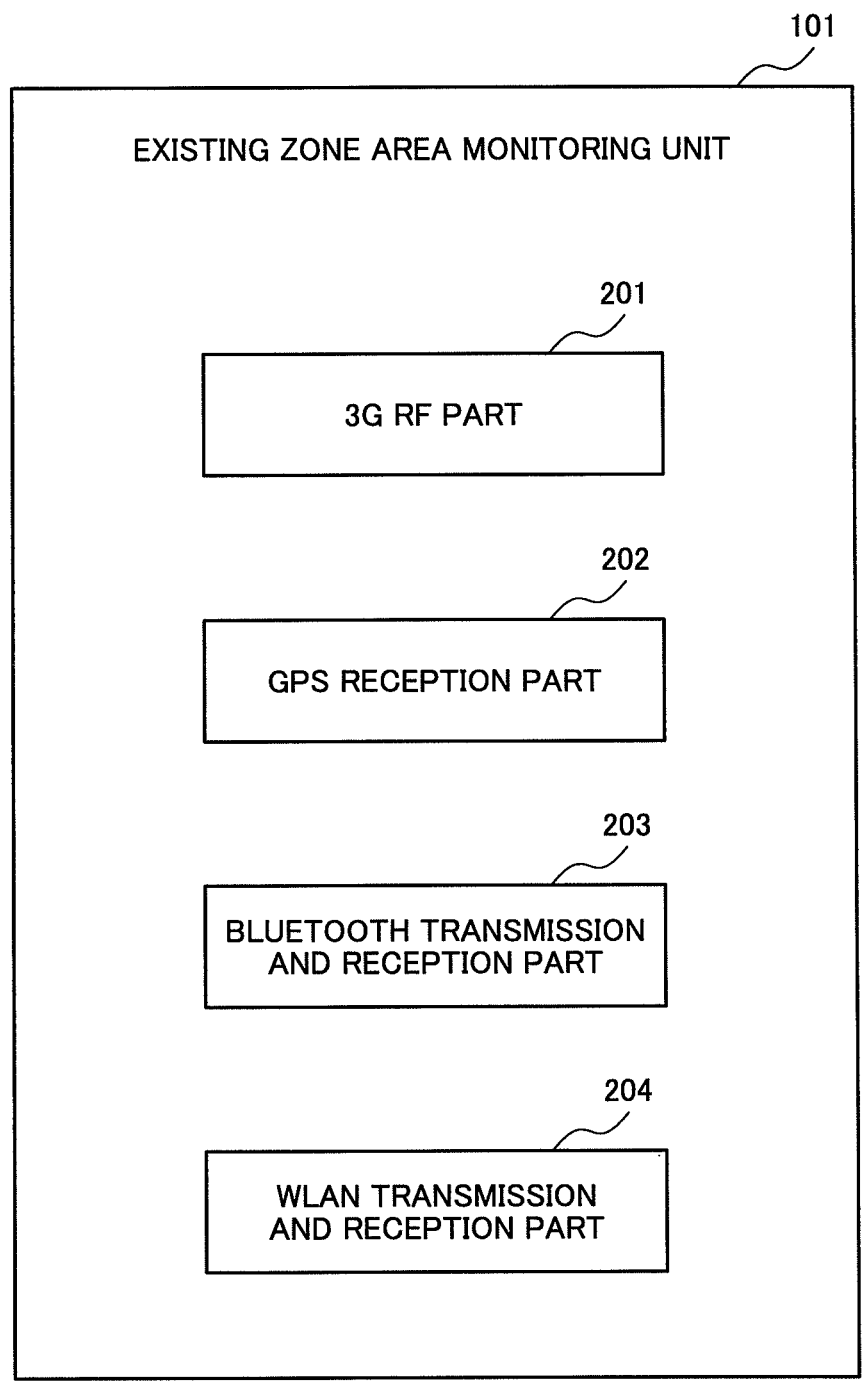
FIG. 2 is a block diagram showing an exemplary configuration of an existing zone area monitoring unit 101.

FIG. 2 is a block diagram showing an exemplary configuration of the existing zone area monitoring unit 101. The existing zone area monitoring unit 101 illustrated in FIG. 2 includes a 3G RF (Radio Frequency) part 201, a GPS (Global Positioning System) reception part 202, a Bluetooth (registered trademark) transmission and reception part 203 and a WLAN (Wireless Local Area Network) transmission and reception part 204.

The 3G RF part (hereinafter, referred to as 3GRF part) 201 acquires location information of the mobile terminal 10 using a communication common carrier's network (a cellular phone network, for example). The 3GRF part 201 communicates with a base station of communication common carrier's network.

The GPS reception part 202 receives clock time information or the like from a GPS satellite, and calculates a location of the mobile terminal 10 using the information received from the GPS satellite. This calculation result will be location information.

The Bluetooth transmission and reception part 203 performs communication and certification with a Bluetooth device such as a mouse and a headset which a user possesses, or with a Bluetooth counterpart device arranged by a user in a desired place purposefully. The Bluetooth transmission and reception part 203 receives identification information as existing zone area information from such devices.

The WLAN transmission and reception part 204 performs communication and certification with a WLAN router, an access point and a game machine and the like possessed by a user. The WLAN transmission and reception part 204 receives identification information as existing zone area information from these devices.

The existing zone area monitoring unit 101 may not include all of the 3GRF part 201, the GPS reception part 202, the Bluetooth transmission and reception part 203 and the WLAN transmission and reception part 204. The existing zone area monitoring unit 101 may include any one of the 3GRF part 201, the GPS reception part 202, the Bluetooth transmission and reception part 203 and the WLAN transmission and reception part 204, or it may include a combination of no smaller than two of them.

Next, an operation will be described.

In the following description of the first exemplary embodiment, the description will be made taking the case where the existing zone area monitoring unit 101 includes the GPS reception part 202, and location information is calculated as existing zone area information as example. In this case, it is supposed that, as an existing zone judgment condition, an area specified fixedly is set as a place where a file is available. However, an area which is specified as a place where a file is available may be different for each file.

Figure 3:
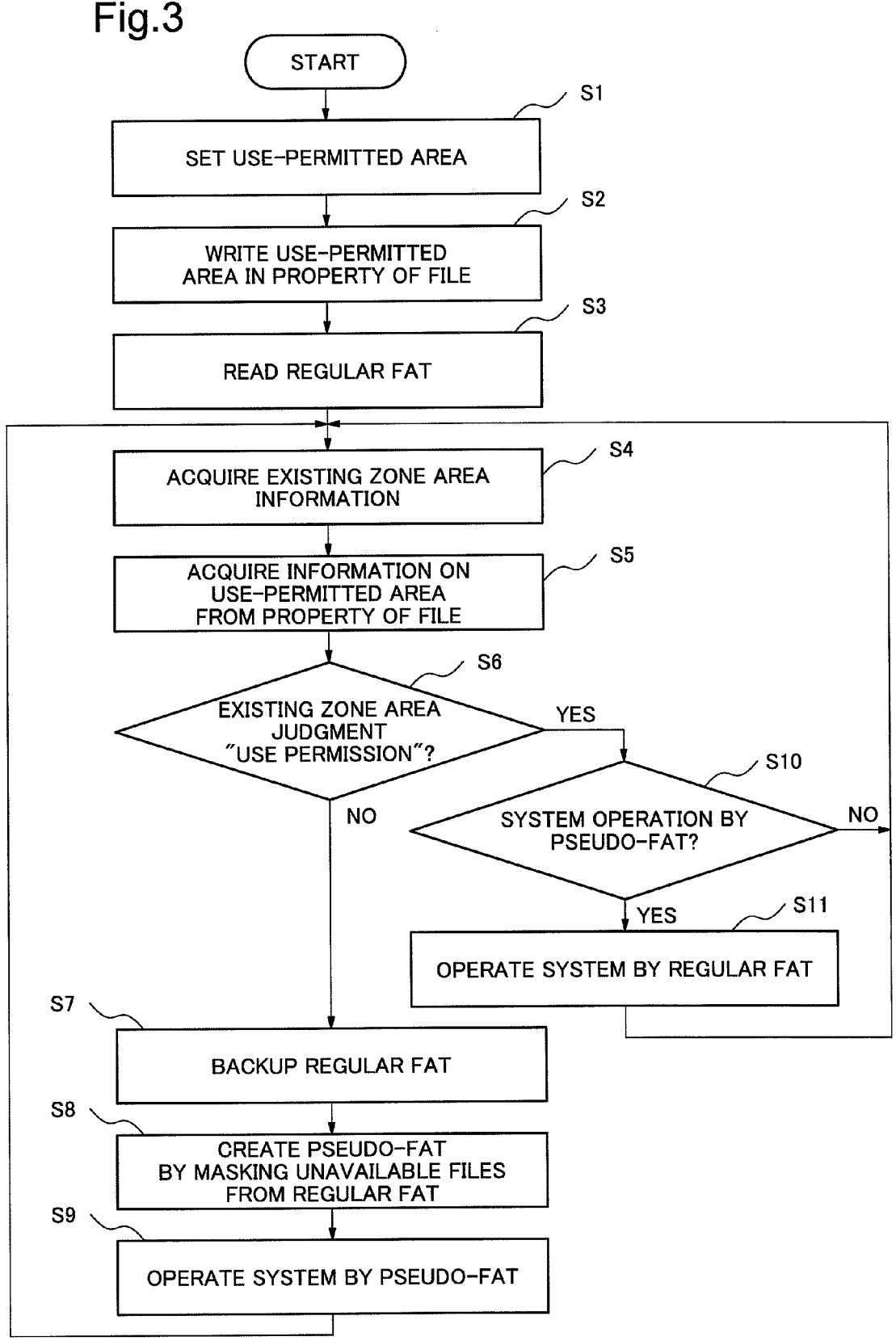
FIG. 3 is a flow chart showing an example of a processing course of a first exemplary embodiment.

FIG. 3 is a flow chart showing an example of a processing course of the first exemplary embodiment. First, the control unit 102 that operates according to an existing zone judgment application accepts a setting of an area in which use of a file is permitted (hereinafter, referred to as a use-permitted area) from a user via the keyboard 107 and the input processing unit 106 (Step S1). In Step S1, the control unit 102 may display a map on the display 105 via the display processing unit 104, for example, and accept selection of the center and the radius (such as 10 km, 20 km . . . ) of a use-permitted area. At that time, circles may be indicated with radiuses that become selection candidates. In this case, by concentric circles, a range of a use-permitted area can be shown to the user visually who has designated the center. Also, it may be such that, to the control unit 102, latitude and longitude which specifies a use-permitted area are inputted as character information via the keyboard 107 and the input processing unit 106. Or, it may be such that an address which specifies a use-permitted area is inputted as character information. Information on a use-permitted area inputted in Step S1 corresponds to an existing zone judgment condition.

In Step S1, a file is designated by a user, and the control unit 102 accepts a setting of a use-permitted area for the file. However, it may be such that a plurality of files are designated by a user, and the control unit 102 accepts a setting of a use-permitted area common to the plurality of files in a lump.

Next, the control unit 102 correlates a file designated by the user in Step S1 and information on a use-permitted area (existing zone judgment condition) which the user has set to the file (Step S2). An example of the processing of Step S2 includes the following. That is, the control unit 102 should prepare a management table showing a corresponding relationship between a file and information on a use-permitted area in the memory 103, and add information which indicates a corresponding relationship between a file designated newly and information on a use-permitted area set to the new file in the management table. Or, when a file is a file of the NTFS (NT File System) form, information on a use-permitted area may be written in the comment part of the property of the file. In FIG. 3, there is illustrated a case where information on a use-permitted area is written in the comment part of the property of a file in Step S2.

Next, the control unit 102 reads a regular FAT from the OS (Operating System) (Step S3).

Then, the control unit 102 acquires existing zone area information from the existing zone area monitoring unit 101 (Step S4). According to the present exemplary embodiment, in the existing zone area monitoring unit 101, the GPS reception part 202 calculates location information of the mobile terminal 10 based on clock time information or the like received from a GPS satellite, and sends it to the control unit 102. The control unit 102 acquires this location information and stores it in the memory 103 as existing zone area information.

Next, the control unit 102 acquires information on a use-permitted area correlated to each file, respectively (Step S5). The example shown in FIG. 3 illustrates a case where the control unit 102 acquires information on a use-permitted area from the comment part of the property of each file, respectively. When a management table showing a corresponding relationship between a file and information on a use-permitted area is being used, the control unit 102 may acquire information on a use-permitted area correlated to each file from the management table.

Next, the control unit 102 compares each existing zone judgment condition of all files to be targets of use by a user and the existing zone area information acquired in Step S4, and, about every file to be a target of use by the user, determines whether the user is allowed to use it or not (Step S6). According to the present exemplary embodiment, whether a location of the terminal apparatus 10 is included in the use-permitted area of every file or not should be judged by comparing the information on the use-permitted area of every file to be a target of use by the user and the location information of the terminal apparatus 10 acquired in Step S4. When the location of the terminal apparatus 10 is included in the use-permitted area of a file, the file can be used. On the other hand, when a location of the terminal apparatus 10 is outside the use-permitted area of a file, the file cannot be used.

When there is a file which the user cannot use among all the files to be targets of use by the user (No in Step S6), the control unit 102 creates a backup of the regular FAT and it is stored in the memory 103 (Step S7). As a result, two regular FATs will exist.

After Step S7, the control unit 102 performs mask processing to files which have been determined as being unavailable in Step S6 among the files enumerated in a regular FAT (here, it is supposed that it is the regular FAT which has existed before the back-up processing of Step S7). The control unit 102 deletes the files determined to be unavailable from the regular FAT (Step S8). By the processing of Step S8, the files determined to be unavailable are eliminated from the regular FAT, and as a result, the regular FAT becomes a pseudo-FAT. In other words, it can be said that the processing of Step S8 is processing for creating a pseudo-FAT from a regular FAT. In FIG. 3, a case when mask processing is performed in Step S8 is being illustrated. The control unit 102 stores the pseudo-FAT created in Step S8 in the memory 103. In Step S8, modification is not performed to the backup of the regular FAT created in Step S7.

Then, the control unit 102 performs system operation using the pseudo-FAT created in Step S8 (Step S9). System operation using a pseudo-FAT unit that the user is allowed to use only files enumerated in the pseudo-FAT, and restriction is applied to files which are not being enumerated in the pseudo-FAT so that the user cannot use them (that is, use is forbidden).

An aspect to apply restriction so that the user cannot use a file which is not enumerated in the pseudo-FAT is not limited in particular. For example, the control unit 102 may forbid the user to browse, copy, move and delete a file which is not enumerated in the pseudo-FAT. Also, by encrypting a file which is not enumerated in the pseudo-FAT, the file may be made unavailable to the user. Further, by compressing a file which is not enumerated in the pseudo-FAT, the file may be made unavailable to the user. When use of a file is restricted by encryption and compression, by a password set in advance being inputted, the control unit 102 may cancel use restriction of a file by decrypting an encrypted file and decompressing a compressed file. When a user tries to start an executable file which is not allowed to be used, because the file does not exist in a pseudo-FAT, an activation error will occur, and the user cannot use the executable file.

After Step S9, the control unit 102 performs processing of Step S4 and later once again in the operation state using such pseudo-FAT.

In Step S6, when all files to be targets of use by a user are allowed to be used (Yes at Step S6), the control unit 102 determines whether the system operation state at that time is the operation state using the pseudo-FAT or not (Step S10). When the system operation state at that time is the operation state using the pseudo-FAT (Yes in Step S10), the control unit 102 overwrites the pseudo-FAT which has been used until then by the regular FAT which has been generated by the backup of Step S7. As a result, the pseudo-FAT becomes a regular FAT. Then, the control unit 102 performs system operation using the regular FAT (Step S11). A system application using a regular FAT unit that a user is allowed to use each file enumerated in the regular FAT, and, in other words, that restriction of use about each file is not applied.

After Step S11, the control unit 102 performs processing of Step S4 and later once again in the operation state using such regular FAT.

In Step S10, when determining that it is the operation state using the regular FAT (No at Step S10), processing of Step S4 and later is performed keeping the operation state of using the regular FAT.

In either cases of the operation state using the regular FAT and of the operation state using the pseudo-FAT, when an update occurs to a FAT which is being used due to user's operation or the like, not only the FAT which is being used but also the other FAT are also updated. For example, when an update occurs to a pseudo-FAT in the operation state using the pseudo-FAT, a similar update is also performed to the regular FAT created by a backup.

Further, here, description has been made about a case where backing up of a regular FAT is performed when there is a file which the user cannot use among all files to be targets of use by the user (No at Step S6). However, timing when backing up of a regular FAT is performed may be when the regular FAT is read in Step S3. These points are the same as those of other exemplary embodiments.

Next, in the present exemplary embodiment, relation between an area where the mobile terminal 10 exists and a file which can be used in that area will be described using a specific example. FIG. 4 indicates an example of each file stored in the mobile terminal 10 and a use-permitted area which has been set to such file. As shown in FIG. 4, a use-permitted area A is set to a specific file A and an executable file α. Meanwhile, a specific file indicates a file besides an executable file. A use-permitted area B is set to a specific file B and an executable file β. Restriction of a use-permitted area is not set to a specific file C and an executable file γ. That is, it is set that the specific file C and the executable file γ can be used regardless of a location of the mobile terminal 10.

Figure 5:
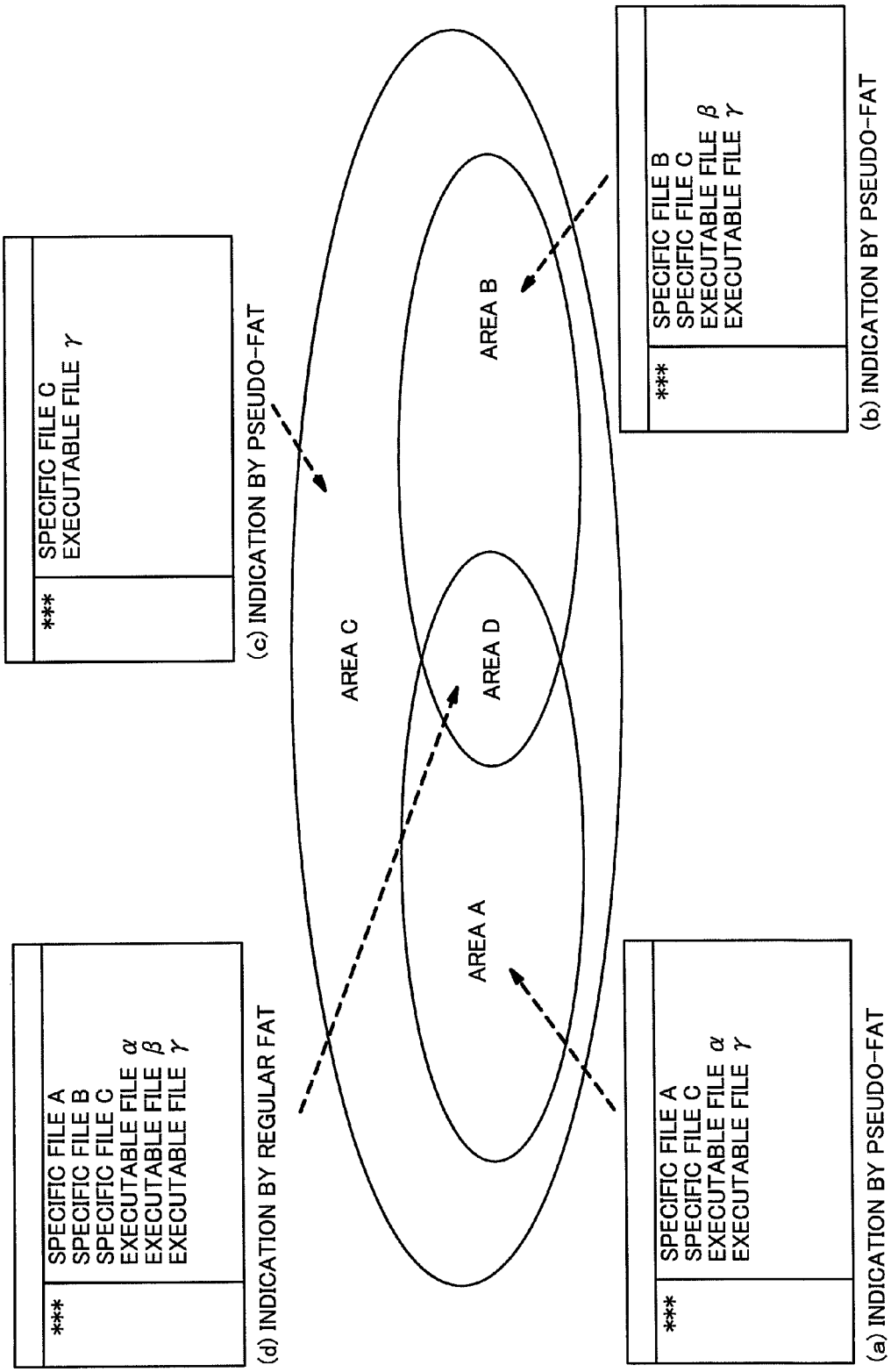
FIG. 5 is an explanatory drawing showing files that can be used in each area.

FIG. 5 is an explanatory drawing showing a file available in each area. As shown in FIG. 5, both the areas A and B are included in the area C. The area which is of a set intersection of the area A and B is made be an area D.

When the control unit 102 performs determination of Step S6 in the state that the mobile terminal 10 exists in the area D, a user can use all files A-C and α-γ (Yes at Step S6), and system operation using a regular FAT is performed. Because all files A-C and α-γ to be targets of use by a user are being enumerated in the regular FAT, the user can use each of these files. For example, when Explorer (the name of general-purpose file management application software) or the like is used, as shown in FIG. 5(d), the control unit 102 can perform display of a list of respective files A-C and α-γ on the display 105. Further, according to operation by a user, it is possible for the control unit 102 to browse, copy, move and delete the specific files A-C and executable files α-γ freely. Also, the control unit 102 can start each of the executable files α, β and γ, and the user can use those executable files.

Next, it is supposed that the mobile terminal 10 has moved to the area A. At that time, when the control unit 102 performs determination of Step S6, although the specific files A and C and the executable files α and γ are available, the specific file B and executable file β are not allowed to be used (No at Step S6). Therefore, the control unit 102 creates a backup of the regular FAT which has enumerated all the files A-C and α-γ to be targets of use by the user (Step S7). Further, from the regular FAT which is not the one created as a backup, a pseudo-FAT is created by eliminating or masking the specific file B and executable file β (Step S8). Then, the control unit 102 performs system operation using the pseudo-FAT.

At that time, because the specific file B and executable file β are not being enumerated in the pseudo-FAT, when Explorer or the like is used, for example, the control unit 102 does not indicate the specific file B and executable file β as shown in FIG. 5(a). For this reason, the user is restricted to browse, copy, move, and delete about the specific file B and executable file β. Because the executable file β is not enumerated in the pseudo-FAT, even if the user performs operation for starting the executable file β, a start error occurs and the user cannot use the executable file β.

On the other hand, because the specific files A and C, executable files α and β are being enumerated on the pseudo-FAT, when Explorer or the like is used, for example, the control unit 102 can perform display of a list of the specific files A and C, executable files α and γ on the display 105 as shown in FIG. 5(a). Then, according to operation by the user, the control unit 102 can browse, copy, move, and delete the specific files A and C, executable file α and γ freely. The control unit 102 can start each of the executable files α and γ, and the user can use those executable files.

Next, it is supposed that the mobile terminal 10 has moved to the area B. At that time, although, when the control unit 102 performs determination of Step S6, the specific files B and C, executable files β and γ are available, the specific file A and executable file α cannot be used (No in Step S6). Therefore, the control unit 102 creates a backup of the regular FAT which has enumerated all the files A-C and α-γ to be targets of use by a user (Step S7). Further, from the regular FAT which is not the one created as a backup, a pseudo-FAT is created by eliminating or masking the specific file A and executable file α (Step S8). Then, the control unit 102 performs system operation using the pseudo-FAT.

At that time, because the specific file A and executable file α are not being enumerated in the pseudo-FAT, when Explorer or the like is used, for example, the control unit 102 does not indicate the specific file A and executable file α as shown in FIG. 5(b). For this reason, the user is restricted to browse, copy, move, and eliminate about the specific file A and executable file α. Because the executable file α is not enumerated in a pseudo-FAT, even if the user performs operation for starting the executable file α, a start error occurs and the user cannot use the executable file α.

On the other hand, because the specific files B and C, executable files β and γ are being enumerated on the pseudo-FAT, when Explorer or the like is used, for example, the control unit 102 can perform display of a list of the specific files B and C, executable files β and γ on the display 105 as shown in FIG. 5(b). Then, according to operation by the user, the control unit 102 can browse, copy, move, and eliminate the specific files B and C, executable files β and γ freely. The control unit 102 can start each of the executable files β and γ, and the user can use those executable files.

Further, it is supposed that the mobile terminal 10 has moved to the area C. At that time, when the control unit 102 performs determination of Step S6, although the specific file C, executable file γ are available, the specific file A, B and executable file α, β cannot be used (No at Step S6). Therefore, the control unit 102 creates a backup of the regular FAT which has enumerated all the files A-C and α-γ to be targets of use by a user (Step S7). Further, from the regular FAT which is not the one created as a backup, a pseudo-FAT is created by eliminating or masking the specific files A, B and executable files α, β (Step S8). Then, the control unit 102 performs system operation using the pseudo-FAT.

At that time, because the specific files A, B and executable files α, β are not being enumerated in the pseudo-FAT, when Explorer or the like is used, for example, the control unit 102 does not indicate the specific files A, B and executable files α, β as shown in FIG. 5(c). For this reason, the user is restricted to browse, copy, move, and eliminate the specific files A, B and executable files α, β. Because the executable files α, β are not being enumerated in the pseudo-FAT, even if the user performs operation for starting the executable files α, β, a start error occurs and the user cannot use the executable files α, β.

On the other hand, because the specific file C and executable file γ are being enumerated on the pseudo-FAT, when Explorer or the like is used, for example, the control unit 102 can perform display of a list of the specific file C and executable file γ on the display 105 as shown in FIG. 5(c). Then, according to operation by the user, the control unit 102 can browse, copy, move, and eliminate the specific file C and executable file γ freely. The control unit 102 can start executable file γ, and the user can use the executable file.

As has been described taking the case where a use-permitted area is designated in an existing zone judgment condition as an example, according to this exemplary embodiment, an area where use of a file is forbidden (a use-forbidden area) may be set for each files.

In addition, although, in the above-mentioned example, a case in which Explorer (a general-purpose file management application software) is used has been illustrated, when it is a system that use of a general-purpose file management application software is forbidden, the control unit 102 should manage a FAT according to an existing zone judgment application. In this case, the regular FAT reading processing of Step S3 (refer to FIG. 3) may not be performed.

Further, according to this exemplary embodiment, although a case where the information management apparatus 10 is realized as a mobile terminal has been illustrated, the information management apparatus 10 may be a PC or a mobile phone.

Also, the information management apparatus 10 may be realized as an external recording medium like a USB memory, for example. When the information management apparatus 10 is realized as an external recording medium, a component corresponding to a user interface such as the display 105, the display processing unit 104, the keyboard 107 and the input processing unit 106 may not be included. However, even in such aspect, the information management apparatus 10 includes the existing zone area monitoring unit 101, the control unit 102 and the memory 103. These points are the same as those of other exemplary embodiments.

According to the present exemplary embodiment, processing to correlate a file designated by a user and information on a use-permitted area which the user has set to the file (existing zone judgment condition) (Step S2) is performed. Accordingly, an area (place) where a file is not allowed to be used can be set for each file separately.

Because an existing zone judgment condition is set for each file and the information management apparatus 10 compares location information and an existing zone judgment condition, when the information management apparatus 10 exists outside the use-permitted area of a file which falls into the categories of confidential information and personal information, existence of the file can be hidden automatically. Also, browsing, copying, move and deletion of the file can be restricted. When the file is an executable file, activation of the executable file can be restricted.

(The Second Exemplary Embodiment)

In the second exemplary embodiment, description will be made taking the case where an information management apparatus is the terminal apparatus 10 of a structure illustrated in FIG. 1 as example. According to the second exemplary embodiment, a case where the existing zone area monitoring unit 101 has the Bluetooth transmission and reception part 203 (refer to FIG. 2), and as existing zone area information, the Bluetooth transmission and reception part 203 receives from a device in the neighborhood specific data specific to that device is taken as an example. It is supposed that, as an existing zone judgment condition, specific data specific to a device designated by a user in advance is determined. That is, when specific data of a device which the user has designated is set as an existing zone judgment condition about a certain file, and specific data of a neighboring device received as existing zone area information is the same with the specific data that has been set, the terminal apparatus 10 permits use of the file. Also, when specific data set as an existing zone judgment condition has not been received from the neighboring device, use of the file is forbidden. As is the case with the first exemplary embodiment, an existing zone judgment condition is set for each file. Meanwhile, it can be said that specific data specific to a device is an identification information of the device.

Figure 6:
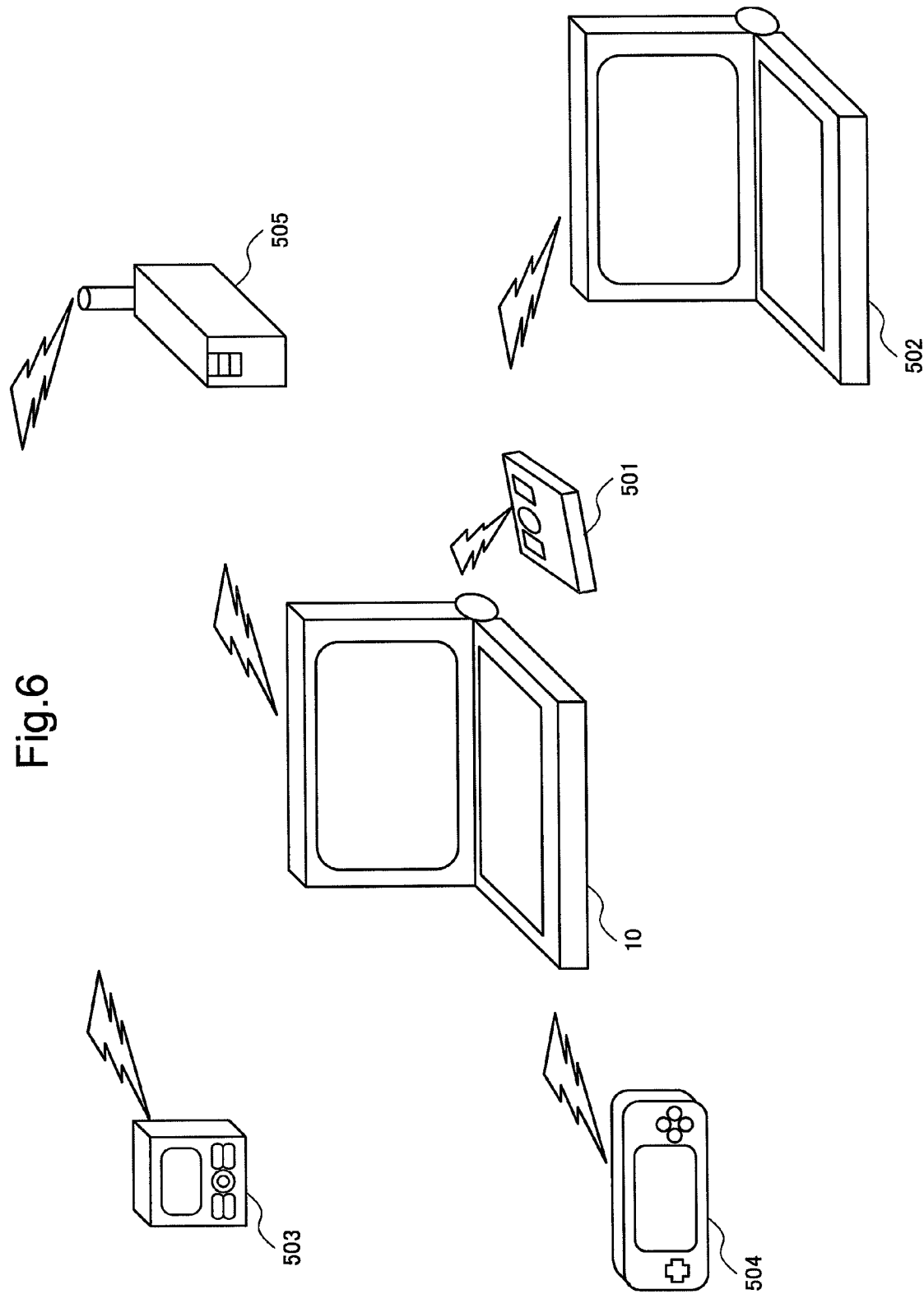
FIG. 6 is an explanatory drawing showing an example of peripheral devices that are arranged around the terminal apparatus 10 and can be designated by a user in a second exemplary embodiment.

FIG. 6 indicates an example of peripheral devices that are arranged around the terminal apparatus 10, and can be designated by a user according to the second exemplary embodiment. For example, the following devices can exist around the terminal apparatus 10 in a general office and house. That is, there can exist a Bluetooth mouse 501 used as a user interface of the terminal apparatus 10, a personal computer (PC) 502 which the user of the terminal apparatus 10, a user's colleague, a family member or the like uses, another mobile terminal 503 and a game machine 504 and the like. Also, a mobile phone may exist. It is supposed that the Bluetooth mouse 501, the PC 502, the mobile terminal 503 and the game machine 504 which exist around the terminal apparatus 10 (hereinafter, these devices may be described as the devices 501-504 or the like together) are equipped with a Bluetooth transmission and reception unit to perform Bluetooth communication, respectively. These devices 501-504 possess a unique BDA (Bluetooth Device Address), respectively. A BDA is synonymous with a MAC (Media Access Control) address.

In order to realize this exemplary embodiment, a Bluetooth key station 505 that performs authentication by a Bluetooth connection with the mobile terminal 10 may be included. The Bluetooth key station 505 also possesses a BDA.

Generally, in a Bluetooth device, Bluetooth devices adjacent each other exchange specific data of each of the devices with each other to perform authentication processing (pairing). Specific data exchanged at that time includes "a BDA (MAC address)", "a device name" and "a corresponding profile". It can be said that such specific data is identification information of a Bluetooth device. In this exemplary embodiment, the existing zone area monitoring unit 101 (refer to FIG. 1) of the mobile terminal 10 should receive the above-mentioned "BDA (MAC address)", "device name" and "corresponding profile" from the neighboring devices 501-505 as specific data specific to each device. Accordingly, an area where use of a file is permitted is a user's office or house, for example, and, more specifically, is a neighborhood of the device designated by the user. For example, when the mobile terminal 503 is being designated by the user and if the user is carrying the mobile terminals 10, 503, and the mobile terminal 10 exists in a neighborhood of the mobile terminal 503, a file can be used even if the user is moving.

Meanwhile, the Bluetooth transmission and reception part 203 installed in the existing zone area monitoring unit 101 should receive specific data (such as a BDA) of a neighboring device from the neighboring device as existing zone area information, and it does not have to establish authentication processing at that time. Or, the following thing can be also made a condition of permission of use of a file. That is, to establish authentication processing between the device which will be a sender of existing zone area information and the mobile terminal 10, in addition to correspondence of specific data of a predetermined device set as an existing zone judgment condition with specific data specific to a neighboring device received from the neighboring device as existing zone area information.

Next, an operation of the second exemplary embodiment will be described. Description will be omitted about the same matters as the first exemplary embodiment. The operation of the second exemplary embodiment will be described also using FIG. 3. First, the control unit 102 that operates according to an existing zone judgment application accepts a setting of information on a use-permitted area about a file (Step S1). Meanwhile, according to this exemplary embodiment, information on a use-permitted area (in other words, existing zone judgment condition) is represented as specific data of a Bluetooth device designated by a user, and use of a file will be permitted if it is an area where the specific data is received.

According to this exemplary embodiment, in Step S1, the control unit 102 makes the Bluetooth transmission and reception part 203 transmit a search signal of surrounding Bluetooth devices. The Bluetooth mouse 501, the PC 502, the mobile terminal 503, the game machine 504, the Bluetooth key station 505 and the like (refer to FIG. 6) which have received the search signal from the terminal apparatus 10 transmit specific data specific to those devices, respectively. For example, each of the devices 501-505 and the like should transmit specific data such as a BDA (MAC address).

The control unit 102 makes a part or all of the specific data received from each of the devices 501-505 and the like displayed on the display 105. The user selects a specific data of a Bluetooth device to be used as an existing zone judgment condition from the indicated specific data. The control unit 102 accepts selection operation by the user. That is, selection of specific data to be an existing zone judgment condition is accepted.

To the control unit 102, specific data such as a BDA (MAC address) may be inputted directly via the keyboard 107 and the input processing unit 106 as character information. The inputted specific data corresponds to an existing zone judgment condition.

Also, in Step S1, a file is designated by the user, for example, and the control unit 102 accepts a setting of an existing zone judgment condition (specific data of a device selected by the user) about the file. It may be such that a plurality of files are designated by the user, and the control unit 102 accepts a setting of an existing zone judgment condition which is common to the plurality of files in a lump.

In Step S1, when the user selects specific data of the PC 502 that is always used in an office or the specific data of the Bluetooth key station 505 that is of permanent installation, for example, the neighborhood of the PC 502 and the neighborhood of the Bluetooth key station 505 will be a use-permitted area of a file. That is, it means that the office is set as a use-permitted area. Further, when a user selects specific data of the mobile terminal 503 that is used separately from the mobile terminal 10, for example, it means that a neighborhood of the mobile terminal 503 is set as a use-permitted area of a file. In other words, when the user carries the mobile terminals 10, 503 and the mobile terminal 10 exists in the neighborhood of the mobile terminal 503, the user can use a file not only when he/she is in the office but also in a place where he/she has moved to.

Meanwhile, in Step S1, an existing zone judgment condition may be set such that specific data of a plurality of devices are designated, and, when all of a plurality of pieces of specific data are received from the surrounding Bluetooth devices, use of a file is permitted. Also, an existing zone judgment condition may be set such that specific data of a plurality of devices are designated, and, when the specific data of at least one Bluetooth device among these plurality of pieces of specific data is received from the surrounding Bluetooth devices, use of a file is permitted.

After Step S1, the control unit 102 correlates a file designated by the user in Step S1 and the existing zone judgment condition which the user has set to the file (Step S2). The aspect to correlate a file and the existing zone judgment condition set to the file is similar to Step S2 in the first exemplary embodiment. For example, the control unit 102 should simply prepare a management table indicating a corresponding relationship between a file and information on a use-permitted area in the memory 103, and add information which indicates a corresponding relationship between a file designated newly and the existing zone judgment condition about the file in the management table. Or, when the file is of the NTFS form, an existing zone judgment condition may be written in the comment part of the property of the file.

The control unit 102 reads a regular FAT from the OS (Step S3). This operation is similar to Step S3 in the first exemplary embodiment.

Next, the control unit 102 acquires existing zone area information from the existing zone area monitoring unit 101 (Step S4). According to this exemplary embodiment, the control unit 102 makes the Bluetooth transmission and reception part 203 in the existing zone area monitoring unit 101 transmit a search signal (refer to FIG. 2). When this search signal is received, each Bluetooth device which exists around the mobile terminal 10 transmits the specific data specific to a Bluetooth device itself such as a BDA. The Bluetooth transmission and reception part 203 of the mobile terminal 10 receives the specific data of each of those Bluetooth devices around, and sends each piece of specific data to the control unit 102. Then, the control unit 102 acquires each piece of the specific data, and stores the specific data of each Bluetooth device in the memory 103 as existing zone area information, respectively.

Next, the control unit 102 acquires an existing zone judgment condition correlated to each file (Step S5). For example, the control unit 102 should acquire information on an existing zone judgment condition from the comment part of the property of each file, respectively. When a management table indicating a corresponding relationship between a file and an existing zone judgment condition is being used, the control unit 102 may acquire an existing zone judgment condition correlated to each file from the management table.

Next, the control unit 102 compares each of the existing zone judgment conditions of all files to be targets of use by the user and the existing zone area information acquired in Step S4, and, about all files to be targets of use by the user, determines whether the user is allowed to use a file or not (Step S6). Here, existing zone area information means the specific data of each surrounding Bluetooth device in this exemplary embodiment. According to this exemplary embodiment, each existing zone judgment condition (specific data of a Bluetooth device designated by a user) of all files to be targets of use by the user and the specific data of each surrounding Bluetooth device acquired in Step S4 should be compared. When specific data of a Bluetooth device set as an existing zone judgment condition about a certain file is the same with any one of the pieces of specific data acquired in Step S4, it should judge that the user is allowed to use the file. When the specific data of a Bluetooth device set as an existing zone judgment condition about a certain file is not equal to any pieces of the specific data acquired in Step S4, it should be judged that the user is not allowed to use the file.

The operations after the judgment processing of Step S6 (operations after Step S7 and operations after Step S10) are similar to those operations in the first exemplary embodiment, and description will be omitted.

Also, in the second exemplary embodiment, the same effect as the first exemplary embodiment is obtained.

(The Third Exemplary Embodiment)

In the third exemplary embodiment, description will be also made by taking the case where an information management apparatus is the terminal apparatus 10 of the structure illustrated in FIG. 1 as an example. In the third exemplary embodiment, a case where the existing zone area monitoring unit 101 includes the WLAN transmission and reception part 204 (refer to FIG. 2), and as existing zone area information, the WLAN transmission and reception part 204 receives identification information of devices from the devices in the neighborhood is taken as an example. In this exemplary embodiment, a BSSID (Basic Service Set Identifier) and a SSID (Service Set Identifier) in an MAC frame transmitted from each device should be employed as identification information of a device. It is supposed that, as an existing zone judgment condition, the identification information of a device designated by a user is set in advance. That is, the identification information (BSSID and SSID) of a device which the user designated is set as an existing zone judgment condition about a certain file, and, when the identification information of a neighboring device received as existing zone area information is equal to the identification information which has been set as an existing zone judgment condition, the terminal apparatus 10 permits use of the file. When the identification information set as an existing zone judgment condition has not been received from a neighboring device, use of the file is forbidden. An existing zone judgment condition is set for each file as is the case with the first exemplary embodiment.

FIG. 7 indicates an example of peripheral devices that are arranged around the terminal apparatus 10, and can be designated by a user in the third exemplary embodiment. For example, around the terminal apparatus 10 in a general office and house, there can exist devices such as a WLAN access point 601, another mobile terminal 602, a game machine 603 and a PC 604 which the user of the terminal apparatus 10, a user's colleague or a family member or the like uses. Also, a mobile phone may exist. The WLAN access point 601, the mobile terminal 602, the game machine 603 and the PC 604 which exist around the terminal apparatus 10 (hereinafter, these devices may be described as the devices 601-604 or the like together) are equipped with a WLAN transmission and reception unit, respectively. A unique BSSID (the same as a MAC address) and a SSID which a user can designate optionally are set to devices 601-604, respectively.

Figure 8:
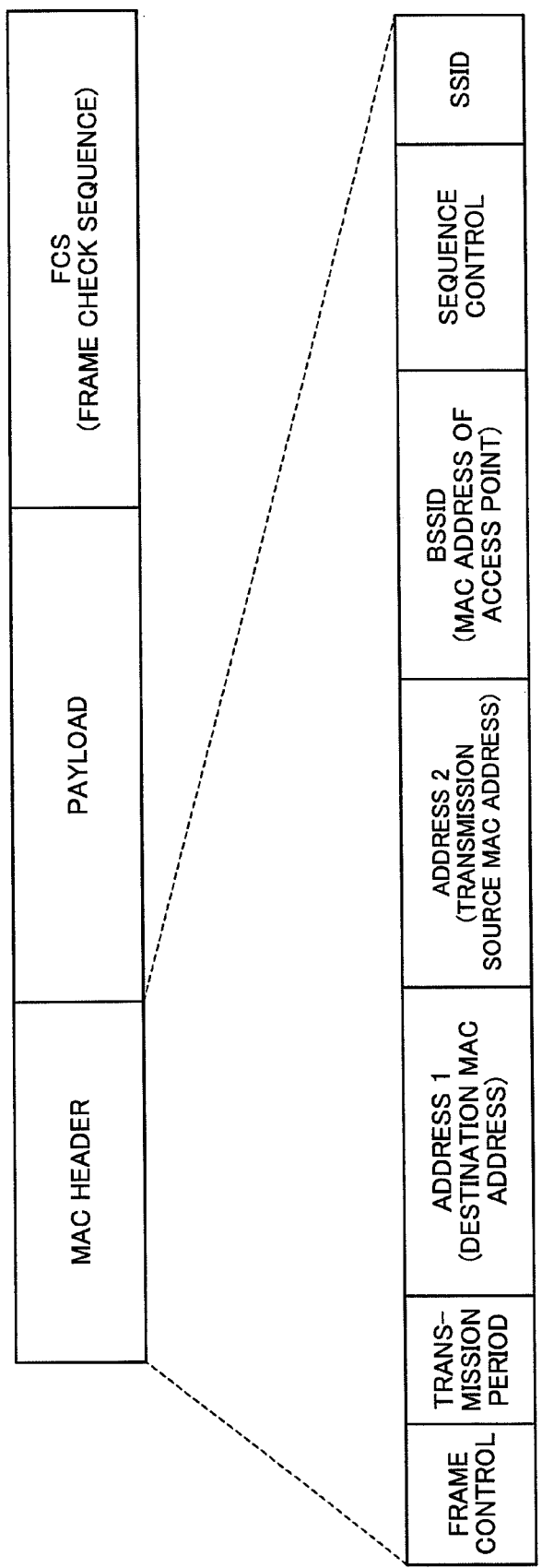
FIG. 8 is an explanatory drawing showing a MAC frame structure of a management frame of a general WLAN.

A use mode of general WLAN equipment includes an ad hoc mode with which WLAN devices communicate directly with each other without going through the WLAN access point 601, and an infrastructure mode with which WLAN devices communicate with each other via the WLAN access point 601. FIG. 8 indicates a MAC frame structure of a management frame of a general WLAN. As shown in FIG. 8, a BSSID and a SSID are included in an MAC header. When WLAN equipment communicates, an MAC frame shown in FIG. 8 is used in either of the modes. Accordingly, WLAN equipment can recognize the BSSID and SSID of a counterpart with each other.

For example, in the ad hoc mode, a "beacon signal" which WLAN equipment transmits periodically is a management frame, and it has the MAC frame structure shown in FIG. 8. Accordingly, the mobile terminal 10 can acquire the BSSID, SSID of surrounding WLAN equipment.

In the infrastructure mode, although the above-mentioned "beacon signal" is also used, in order to search the WLAN access point 601 that exists around the mobile terminal 10, the mobile terminal 10 transmits a "Probe-Request signal". When the "Probe-Request signal" is received, the WLAN access point 601 transmits a "Probe-Response signal". This "Probe-Response signal" is also a management frame, and it has the MAC frame structure shown in FIG. 8. Accordingly, the mobile terminal 10 can acquire the BSSID, SSID of the WLAN access point 601.

Meanwhile, as existing zone area information, the WLAN transmission and reception part 204 installed in the existing zone area monitoring unit 101 should receive the BSSID and SSID of a neighboring device from the neighboring device, and does not have to establish authentication processing at that time. As an existing zone judgment condition, a condition for permitting use of a file may be such that the BSSID and SSID of a predetermined device that has been determined is equal to the BSSID and SSID received from a surrounding WLAN device as existing zone area information. Moreover, as an existing zone judgment condition, a condition for permitting use of a file may be such that establishment of authentication processing between a device to be a transmission source of existing zone area information and the mobile terminal 10 is made.

Next, an operation of the third exemplary embodiment will be described. Description will be omitted about the same matters as first and second exemplary embodiment. The operation of the third exemplary embodiment will be also described using FIG. 3. First, the control unit 102 that operates according to an existing zone judgment application accepts a setting of information on a use-permitted area about a file (Step S1). Meanwhile, according to this exemplary embodiment, information on a use-permitted area (in other words, an existing zone judgment condition) is represented as identification information (BSSID and SSID) of a WLAN device designated by a user, and use of a file will be permitted if it is an area where the identification information is received.

According to this exemplary embodiment, in Step S1, the WLAN transmission and reception part 204 searches WLAN equipment around the mobile terminal 10 by such as receiving a "beacon signal" and transmitting a "Probe-Request signal". Specifically, the WLAN transmission and reception part 204 receives a "beacon signal" from neighboring devices 602-604, or transmits a "Probe-Request signal" and receives a "Probe-Response signal" transmitted from the WLAN access point 601 as a reply. Then, the WLAN transmission and reception part 204 sends the BSSID and SSID in the MAC frame of the "beacon signal", the "Probe-Response signal" or the like to the control unit 102, and the control unit 102 acquires the BSSID and SSID. The control unit 102 displays the BSSIDs and SSIDs of the surrounding WLAN devices on the display 105. The user performs selection of identification information (BSSIDs and SSIDs) of the indicated WLAN devices. The control unit 102 accepts selection operation by the user. That is, selection of identification information which becomes an existing zone judgment condition is accepted.

To the control unit 102, a BSSID and SSID may be inputted directly via the keyboard 107 and the input processing unit 106 as character information. The inputted BSSID and SSID correspond to an existing zone judgment condition.

Also, in Step S1, a file is designated by the user, for example, and the control unit 102 accepts a setting of an existing zone judgment condition (the BSSID and SSID selected by the user) about the file. It may be such that a plurality of files are designated by a user, and the control unit 102 accepts a setting of an existing zone judgment condition which is common to the plurality of files in a lump.

In Step S1, when the user selects the BSSID and SSID of the WLAN access point 601 that is of permanent installation in an office, for example, the cell of the WLAN access point 601 will be a use-permitted area of a file. That is, it means that the office is set as a use-permitted area. Further, when a user selects the BSSID and SSID of the mobile terminal 602 that is used separately from the mobile terminal 10, for example, it means that a neighborhood of the mobile terminal 602 is set as a use-permitted area of a file. In other words, when the user carries a mobile terminal 10, 602 and the mobile terminal 10 exists in a neighborhood of the mobile terminal 602, the user can use a file not only when he/she is in the office but also in a place where he/she has moved to.

Meanwhile, in Step S1, an existing zone judgment condition may be set such that identification information (BSSIDs and SSIDs) of a plurality of WLAN devices are designated, and, when all of the plurality of pieces of identification information are received from the surrounding WLAN devices, use of a file is permitted. An existing zone judgment condition may be set such that identification information (BSSIDs and SSIDs) of a plurality of WLAN devices are designated, and, when the identification information of at least one WLAN device among those plurality of pieces of identification information is received from the surrounding WLAN devices, use of a file is permitted.

After Step S1, the control unit 102 correlates a file designated by the user in Step S1 and the existing zone judgment condition which the user set to the file (Step S2). The aspect to correlate a file and the existing zone judgment condition set to the file is similar to Step S2 in the first and second exemplary embodiments. For example, the control unit 102 should simply prepare a management table indicating a corresponding relationship between a file and information on a use-permitted area in the memory 103, and add information which indicates a corresponding relationship between a file designated newly and the existing zone judgment condition about the file in the management table. Or, when the file is a file of the NTFS form, an existing zone judgment condition may be written in the comment part of the property of the file.

The control unit 102 reads a regular FAT from the OS (Step S3). This operation is similar to Step S3 in the first exemplary embodiment.

Next, the control unit 102 acquires existing zone area information from the existing zone area monitoring unit 101 (Step S4). According to this exemplary embodiment, the WLAN transmission and reception part 204 searches surrounding WLAN devices periodically, and sends the BSSID and SSID of a surrounding WLAN device obtained by the search to the control unit 102, and the control unit 102 acquires the BSSID and SSID. When the WLAN transmission and reception part 204 performs search, the WLAN transmission and reception part 204 receives a "beacon signal", transmits a "Probe-Request signal" and searches a WLAN device around the mobile terminal 10 as it has been already described. Specifically, the WLAN transmission and reception part 204 receives a "beacon signal" from neighboring devices 602-604, or transmits a "Probe-Request Signal" and receives a "Probe-Response signal" transmitted from the WLAN access point 601 as a reply. Then, the WLAN transmission and reception part 204 should send the BSSID and SSID in the MAC frame of such as a "beacon signal" and a "Probe-Response signal" to the control unit 102. The control unit 102 stores the BSSID and SSID of each WLAN device acquired from the WLAN transmission and reception part 204 in the memory 103 as existing zone area information, respectively.

Next, the control unit 102 acquires an existing zone judgment condition correlated to each file (Step S5). For example, the control unit 102 should acquire information on an existing zone judgment condition from the comment part of the property of each file, respectively. When a management table indicating a corresponding relationship between a file and an existing zone judgment condition is being used, the control unit 102 may acquire an existing zone judgment condition correlated to each file from the management table.

Next, the control unit 102 compares each of the existing zone judgment conditions of all files to be targets of use by a user and the existing zone area information acquired in Step S4, and, about all files to be targets of use by the user, determines whether the user is allowed to use a file or not (Step S6). Here, existing zone area information means the BSSID and SSID of each surrounding WLAN device. According to this exemplary embodiment, each existing zone judgment condition (the BSSID and SSID of a WLAN device designated by a user) of all files to be targets of use by the user and the BSSID and SSID of each surrounding WLAN device acquired in Step S4 may be compared. When the BSSID and SSID of a WLAN device set as an existing zone judgment condition about a certain file is the same with any one of the BSSIDs and SSIDs acquired in Step S4, it should judge that the user is allowed to use the file. When the BSSID and SSID of a WLAN device set as an existing zone judgment condition about a certain file is not equal to any pieces of the BSSIDs and SSIDs acquired in Step S4, it should be judged that the user is not allowed to use the file.

The operations after the judgment processing of Step S6 (operations after Step S7 and operations after Step S10) are similar to those operations in the first and second exemplary embodiments, and description will be omitted.

Also, in the third exemplary embodiment, the same effect as the first and second exemplary embodiments is obtained.

(The Fourth Exemplary Embodiment)

In the fourth exemplary embodiment, description will be also made by taking the case where an information management apparatus is the terminal apparatus 10 of the structure illustrated in FIG. 1 as an example. According to the fourth exemplary embodiment, the existing zone area monitoring unit 101 includes the 3GRF part 201 (refer to FIG. 2). An existing zone judgment condition and existing zone area information are managed in the communication common carrier's network side. According to this exemplary embodiment, as existing zone area information, location information of the mobile terminal 10 is used. A communication common carrier's network (hereinafter, referred to as a carrier network) is a cellular phone network or the like, for example, but it may be other kinds of network.

Figure 9:
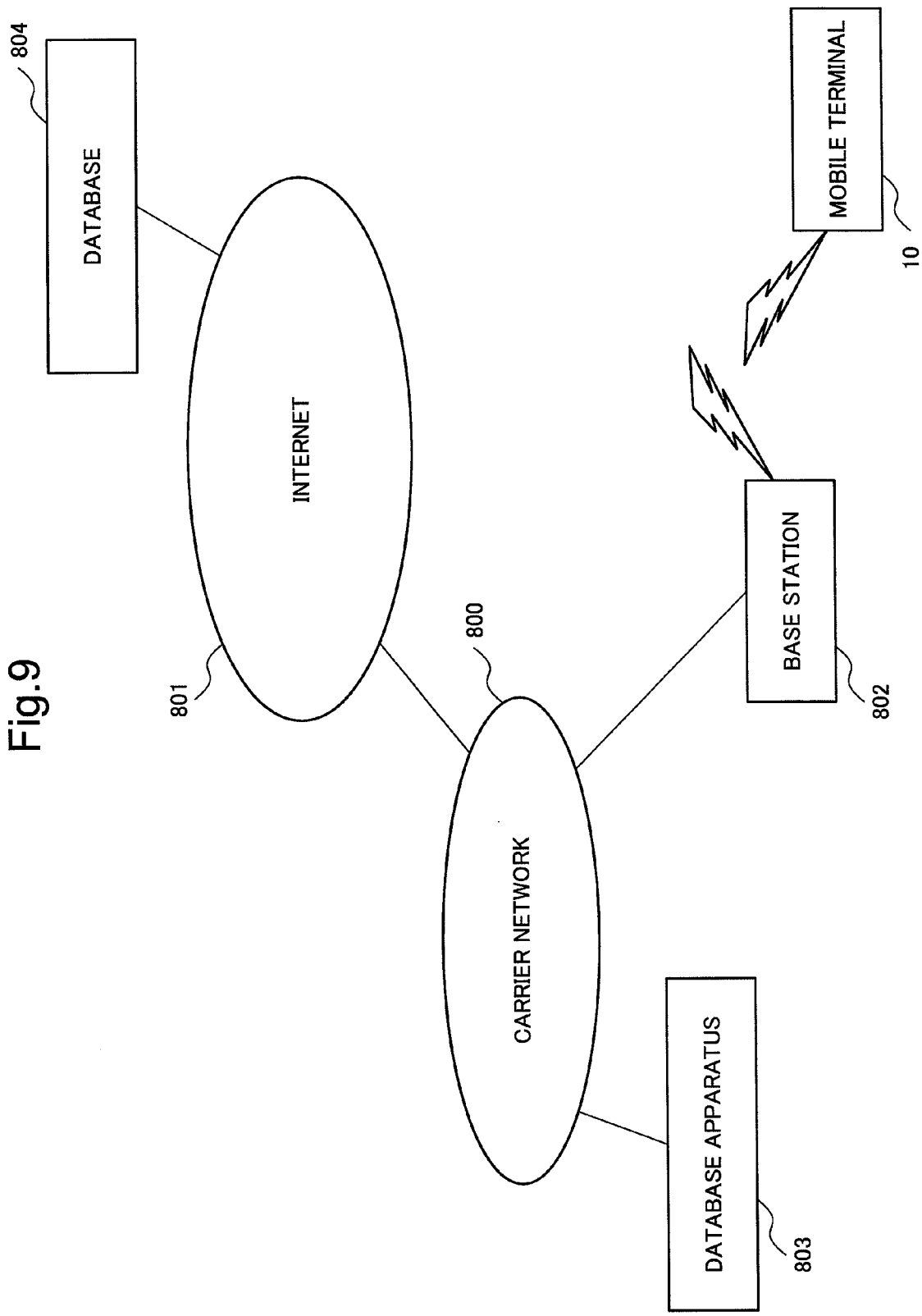
FIG. 9 is an explanatory drawing showing a carrier network and its base station and other units.

FIG. 9 is an explanatory drawing showing a carrier network and its base station and the like. A base station 802 and a database apparatus 803 are installed in a carrier network 800. Meanwhile, although one base station 802 is illustrated in FIG. 9, more than one base station 802 can be provided. The database apparatus 803 stores a corresponding relationship between each base station 802 and a location of that base station on a map. The base station 802 communicates with the 3GRF part 201 (refer to FIG. 2) of the mobile terminal 10. Also, the database apparatus 803 possesses a function to collects information on the mobile terminal 10 with which the base station 802 is communicating from each base station 802 and acquire location information of the mobile terminal 10. Here, for example, location information of the mobile terminal 10 is expressed in location information of a base station 20 corresponding to the cell in which the mobile terminal 10 exists, and the range of the cell will be location information of the mobile terminal 10. The location information of this mobile terminal 10 corresponds to existing zone area information. The database apparatus 803 stores an existing zone judgment condition which has been set about each file held by the mobile terminal 10. An existing zone judgment condition in this exemplary embodiment is an area which is specified fixedly as a place where a file can be used like the case described in the first exemplary embodiment.

The Internet 801 is connected to the carrier network 800. A database 804 having the function of the above-mentioned database 803 may be provided for the Internet 801. In the following description, description will be made taking the case where the database apparatus 803 provided in the carrier network 800 is used as an example.

The mobile terminal 10 is connected to the carrier network 800 via the base station 802. In the carrier network 800, the base station 802 is arranged based on the base station cell design of the communication common carrier. A location of the mobile terminal 10 can be specified by recognizing under which base station 802 the mobile terminal 10 exists. In particular, it is possible to construct a base station of a femto cell, or miniaturize a cell of a base station. By installing such base station of a small cell in an office or a house, more detailed identification of a location of the mobile terminal 10 can be made.

Figure 10:
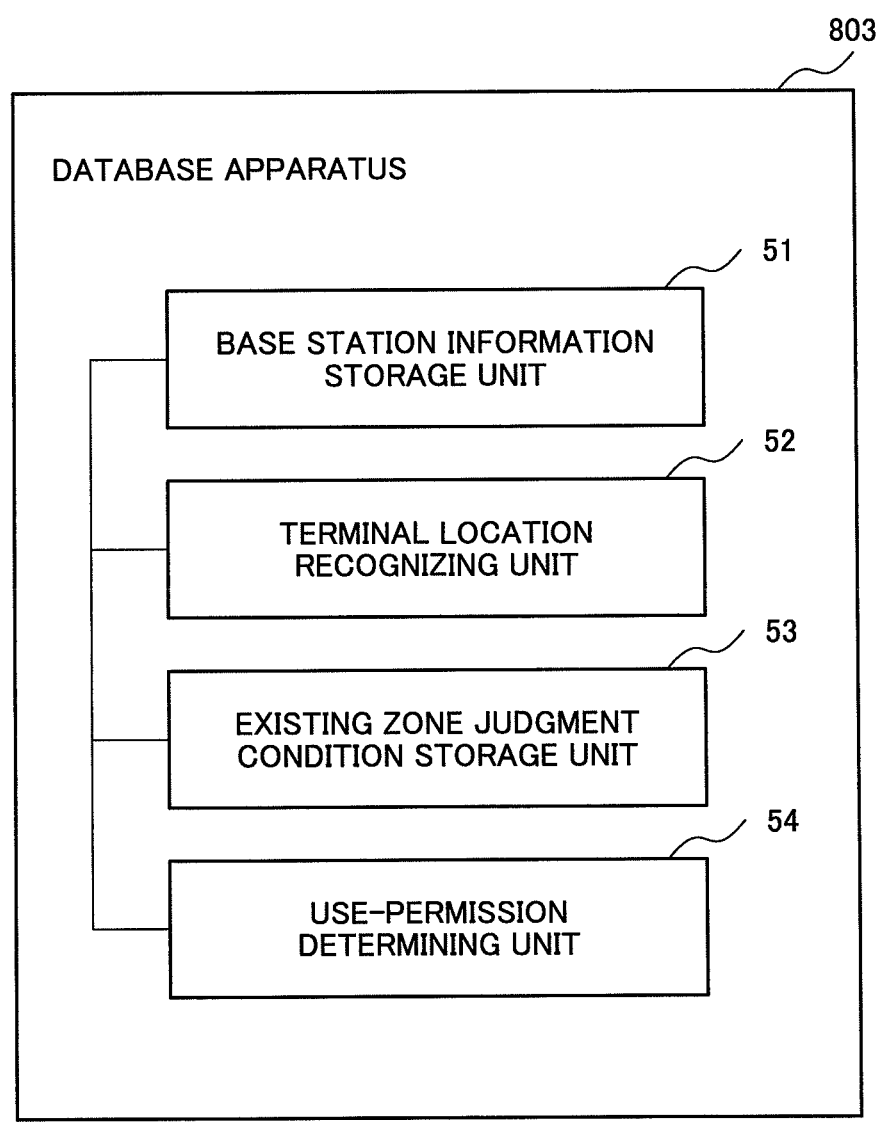
FIG. 10 is a block diagram showing an example of a database apparatus 803.

FIG. 10 is a block diagram showing an example of the database apparatus 803. The database 803 includes a base station information storage unit 51, a terminal location recognizing unit 52, an existing zone judgment condition storage unit 53 and a use-permission determining unit 54.

The base station information storage unit 51 is a storage storing a location of each base station 802 on a map. For example, the base station information storage unit 51 memorizes identification information of each base station 802 and the location of the relevant base station 802 in a correlated manner.

The terminal location recognizing unit 52 recognizes location information of the mobile terminal 10 by collecting information on the mobile terminal which exists in the cell from each base station 802. Meanwhile, when more than one mobile terminal 10 exists, location information should be recognized about each mobile terminal 10. By communicating with the 3GRF part 201 of a mobile terminal in the cell, each base station 802 should specify the mobile terminal in the cell.

Meanwhile, the terminal location recognizing unit 52 may be provided in an apparatus in the carrier network 800 besides the database apparatus 803.

The existing zone judgment condition storage unit 53 stores a corresponding relationship between a file and an existing zone judgment condition for each file of the mobile terminal 10. Here, description will be made taking a case where identification information of a file and an existing zone judgment condition set for the file are stored in a manner being correlated with each other as an example. Description will be made also taking a case where a file name is employed as identification information of a file as an example. In the mobile terminal 10, when an existing zone judgment condition to each file is set, the mobile terminal 10 correlate the name of each file and the existing zone judgment condition set about that file, and transmits these to the database apparatus 803. The existing zone judgment condition storage unit 53 stores each file name and an existing zone judgment condition set about that file in a correlated manner. Meanwhile, when more than one mobile terminal 10 exist, the above-mentioned information should be stored for each mobile terminal 10.

The use-permission determining unit 54 compares location information of a mobile terminal which the terminal location recognizing unit 52 has recognized and an existing zone judgment condition stored in the existing zone judgment condition storage unit 53, and determines whether each file of the mobile terminal 10 is allowed to be used. As has been already described, according to this embodiment, location information of a mobile terminal corresponds to existing zone area information.

Figure 11:
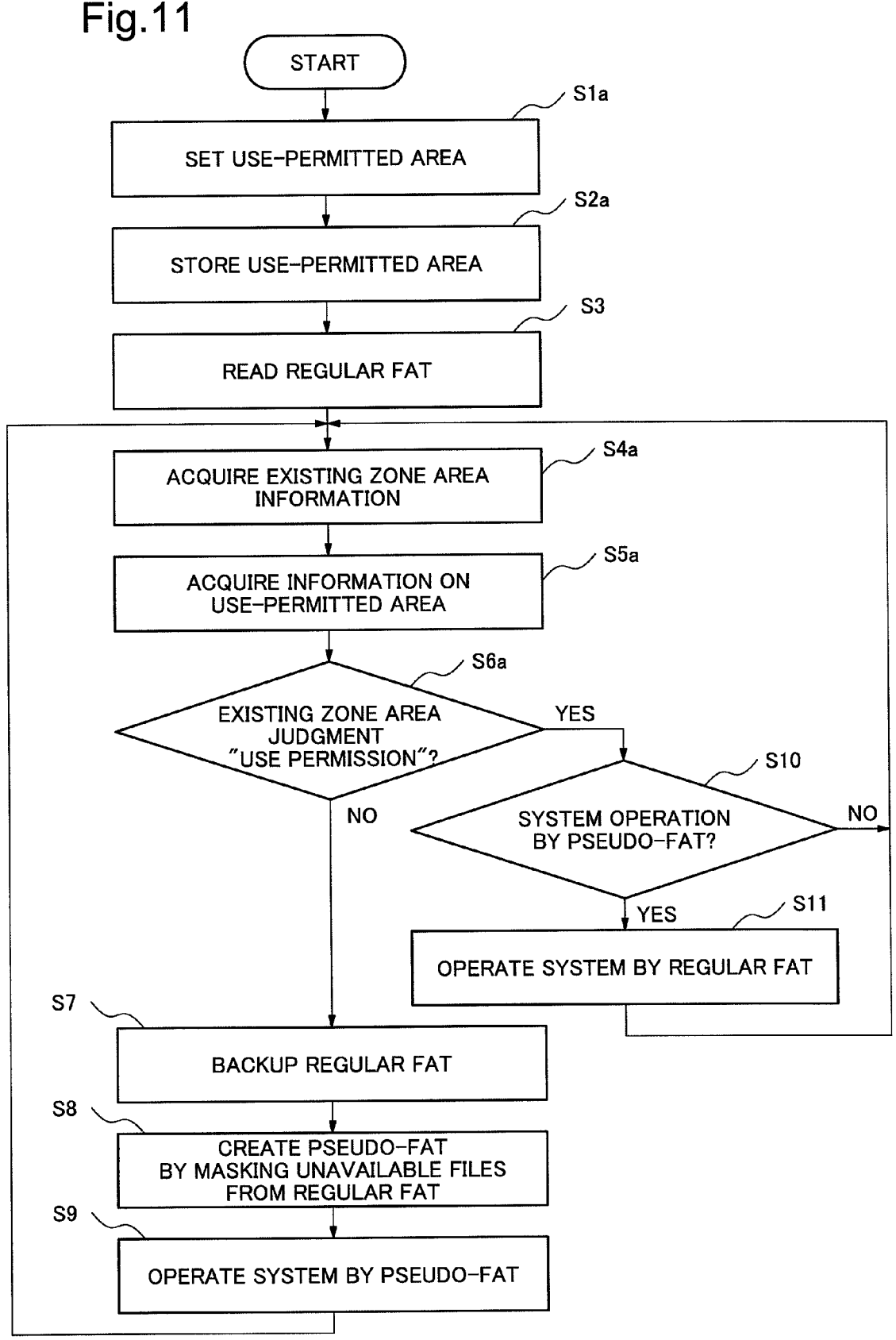
FIG. 11 is a flow chart showing an example of a processing course of a fourth exemplary embodiment.

Next, an operation will be described. FIG. 11 is a flow chart showing an example of the course of processing of the fourth exemplary embodiment. Codes identical with FIG. 3 are attached to the same processing items as the first exemplary embodiment. First, the control unit 102 (refer to FIG. 1) that operates according to an existing zone judgment application accepts a setting of an area within which use of a file is permitted (hereinafter, referred to as a use-permitted area) from a user via the keyboard 107 and the input processing unit 106 (Step S1a). This processing is similar to Step S1 in the first exemplary embodiment. For example, the control unit 102 may display a map on the display 105 via the display processing unit 104, and accept selection of the center and the radius (such as 10 km, 20 km . . . ) of a use-permitted area. At that time, circles may be indicated with radiuses that become selection candidates. Or, to the control unit 102, latitude and longitude which specifies a use-permitted area may be inputted as a character information via the keyboard 107 and the input processing unit 106. Or, it may be such that an address which specifies a use-permitted area is inputted as a character information. Information on a use-permitted area inputted in Step S1a corresponds to an existing zone judgment condition.

In Step S1a, a file is designated by a user, and the control unit 102 accepts a setting of a use-permitted area for the file, for example. However, a plurality of files may be designated by a user, and the control unit 102 may accept a setting of a use-permitted area common to the plurality of files in a lump.

Then, the control unit 102 transmits each file name and information on a use-permitted area set to each file (an existing zone judgment condition) to the database apparatus 803 using the 3GRF part 201 in a correlated manner. When each file name and information on a use-permitted area set to each file is received, the existing zone judgment condition storage unit 53 of the database apparatus 803 stores the information (Step S2a). At that time, the existing zone judgment condition storage unit 53 may search for a base station which corresponds to each use-permitted area set to each file, and store the location information of the searched base station in a manner being correlated with a file name.

The control unit 102 of the mobile terminal 10 reads a regular FAT from the OS (Step S3). This operation is similar to Step S3 in the first exemplary embodiment.

Next, by collecting information on a mobile terminal which exists in a cell from each base station 802, the terminal location recognizing unit 52 recognizes location information of the mobile terminal 10 (Step S4a). For example, when a handover has been caused by a move of the mobile terminal 10, the terminal location recognizing unit 52 collects, from the base station 802 that is a new base station after the handover, information to the effect that the mobile terminal 10 exists in its cell.

Next, the use-permission determining unit 54 compares the existing zone judgment condition (information on a use-permitted area) corresponding to each file name stored in the existing zone judgment condition storage unit 53 and the location information of the mobile terminal 10 recognized by the terminal location recognizing unit 52. Then, about all files to be targets of use by the user in the mobile terminal 10, determination whether the user is allowed to use a file or not is performed (Step S6a). When the location of the terminal apparatus 10 is included in the use-permitted area of a file, the file can be used. On the other hand, when the location of the terminal apparatus 10 is outside the use-permitted area of a file, the file cannot be used.

When determining that, about all files to be targets of use by the user in the mobile terminal 10, the user is allowed to use the files (Yes in Step S6a), the use-permission determining unit 54 transmits information to that effect to the mobile terminal 10. The mobile terminal 10 that has received this information carries out processing after Step S10. The processing after Step S10 is the same as that of the other exemplary embodiments, description will be omitted.

When determining not to permit the user to use a certain file among all the files to be targets of use by the user in the mobile terminal 10 (No in Step S6a), the operation will be as follows. That is, the use-permission determining unit 54 transmits the file name of the file determined not to permit use and an alert to the mobile terminal 10. The mobile terminal 10 that has received the file name determined not to be allowed to be used and the alert performs processing after Step S7. The processing after Step S7 is the same as that of the other exemplary embodiments, and description will be omitted. Meanwhile, in Step S7, a pseudo-FAT should be created by eliminating a file determined not to be allowed to be used from the regular FAT.

The database apparatus 803 should perform processing of steps S4*a*-S6*a* periodically, for example.

Also in this exemplary embodiment, the same effect as the first, second and third exemplary embodiments is obtained. According to this exemplary embodiment, because processing of steps S4*a*-S6*a* is performed in the database apparatus 803 side, the processing load of the mobile terminal 10 can be reduced.

(The Fifth Exemplary Embodiment)

Figure 12:
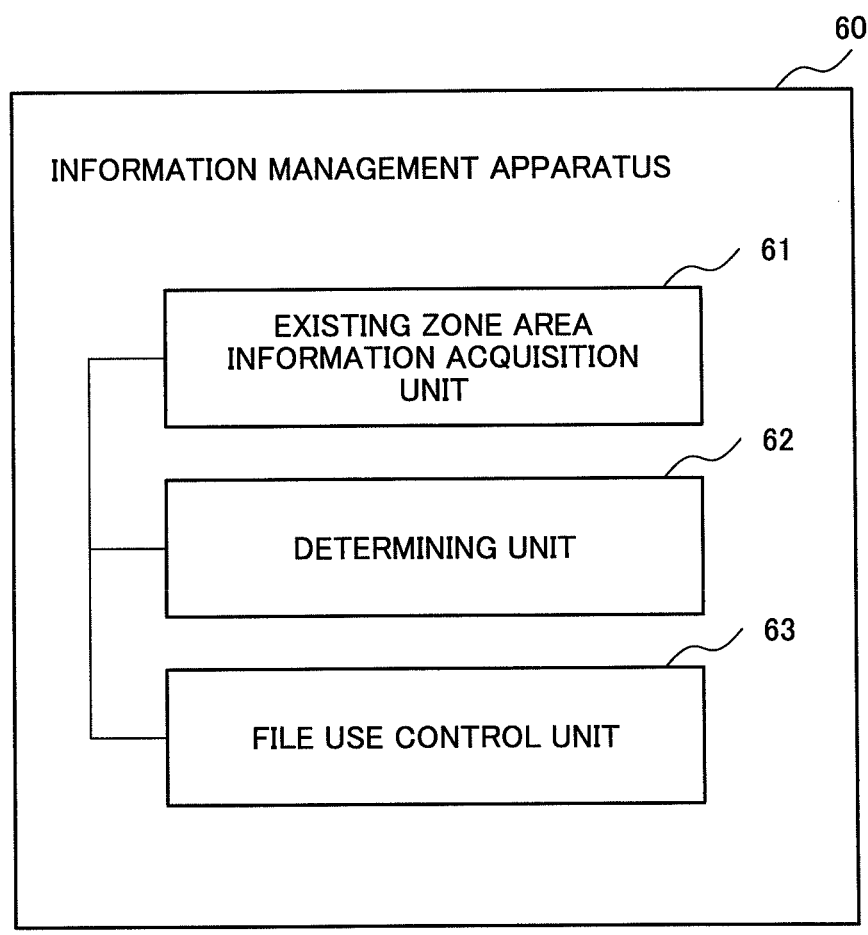
FIG. 12 is a block diagram showing a structure of an information management apparatus of the fifth exemplary embodiment.

Next, the fifth exemplary embodiment of the present invention will be described. FIG. 12 is a block diagram showing a structure of an information management apparatus of this exemplary embodiment. An information management apparatus 60 of this exemplary embodiment includes an existing zone area information acquisition unit 61, a determining unit 62 and a file use control unit 63.

The existing zone area information acquisition unit 61 (the existing zone area monitoring unit 101, for example) acquires existing zone area information. Existing zone area information is information used for determination of whether a file is allowed to be used by comparing it with a condition that is set for each file, and is a condition about an area in which a file can be used or an area in which use of a file is forbidden (an existing zone judgment condition, for example).

The determining unit 62 (the control unit 102 that carries out Step S6, for example) compares existing zone area information and each condition that is set for each file, and determines whether each file to be a target of use by a user is allowed to be used.

When being determined that each of files to be targets of use by the user is allowed to be used, the file use control unit 63 (the control unit 102 that carries out Steps S11 and S9, for example) permits use of each of the files. Moreover, when being determined that there is a file which is not allowed to be used among each of the files to be targets of use by the user, use of files besides that file which is not allowed to be used is permitted.

By such structure, an area in which a file is not allowed to be used can be determined for each file.

Also, a condition input unit (the keyboard 107 and the input processing unit 106, for example) by which a condition that is set for each file and is a condition about an area in which use of a file is allowed or about an area in which use of a file is forbidden is inputted may be provided.

It may be of a structure in which information which indicates an area where a file is allowed to be used is inputted to the condition input unit as a condition, and the existing zone area information acquisition unit 61 acquires location information of the information management apparatus 60 itself as existing zone area information. Moreover, it may be of a structure in which the determining unit 62 compares information which indicates an area where a file is allowed to be used and location information of the information management apparatus itself.

It may be of a structure in which identification information of a device designated by a user is inputted on a file-by-file basis to the condition input unit as a condition, and the existing zone area information acquisition unit 61 acquires identification information of a device existing around the information management apparatus 60 as existing zone area information. Moreover, it may be of a structure in which the determining unit 62 compares identification information of a device inputted to the condition input unit for each file and identification information of a device which exists around the information management apparatus acquired by the existing zone area information acquisition unit.

It may be of a structure in which identification information of a Bluetooth device designated by a user is inputted on a file-by-file basis to the condition input unit as a condition, and the existing zone area information acquisition unit 61 acquires identification information of a Bluetooth device which exists around the information management apparatus 60 as existing zone area information.

It may be of a structure in which identification information of a WLAN device designated by a user is inputted on a file-by-file basis to the condition input unit as a condition, and the existing zone area information acquisition unit 61 acquires identification information of a WLAN device which exists around the information management apparatus 60 as existing zone area information.

It may be of a structure in which, when determining that each file to be a target of use by a user is allowed to be used, the file use control unit 63 refers to file management information in which each file is enumerated. Moreover, it may be of a structure in which, when being determined that there is a file which is not allowed to be used among each of files to be targets of use by a user, file management information which is made by eliminating the file which is not allowed to be used from the files to be targets of use by the user is referred to. Moreover, it may be of a structure in which use of a file which is being enumerated in the file management information being referred to is permitted.

(The Sixth Exemplary Embodiment)

Next, the sixth exemplary embodiment of the present invention will be described.

Figure 13:
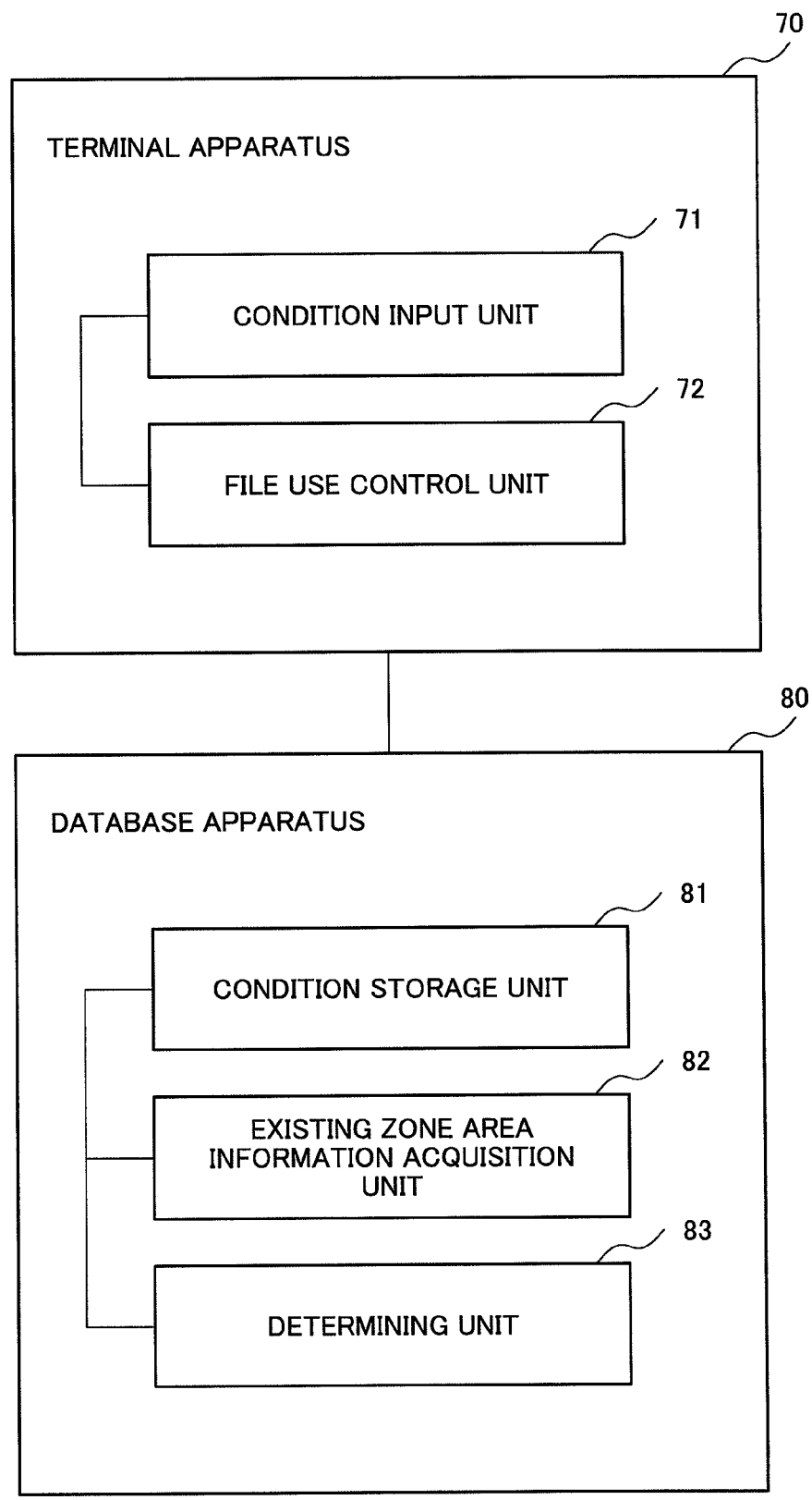
FIG. 13 is a block diagram showing a structure of an information management system of a sixth exemplary embodiment.

FIG. 13 is a block diagram showing a structure of an information management system of this exemplary embodiment. An information management system of this exemplary embodiment includes a terminal apparatus 70 (the mobile terminal 10 in the fourth exemplary embodiment, for example) and a database apparatus 80 (the database apparatus 803, for example).

The terminal apparatus 70 includes a condition input unit 71 and a file use control unit 72. To the condition input unit 71 (the keyboard 107 and the input processing unit 106, for example), information which indicates an area where a file is allowed to be used is inputted on a file-by-file basis as a condition that permits use of a file.

The database apparatus 80 receives a condition set for each file from the terminal apparatus 70, and stores the conditions. The database apparatus 80 includes a condition storage unit 81, an existing zone area information acquisition unit 82 and a determining unit 83.

The condition storage unit 81 (the existing zone judgment condition storage unit 53, for example) stores a condition set for each file that has been received from the terminal apparatus.

The existing zone area information acquisition unit 82 acquires location information of the terminal apparatus 70 as existing zone area information. Existing zone area information is information used for determination of whether use of a file is permitted or not by comparing with a predetermined condition.

The determining unit 83 compares existing zone area information and each condition set for each file, and determines whether each file to be a target of use by a user is allowed to be used. As a result of the determination, when being determined that each of the files is allowed to be used, notification to that effect is made to the terminal apparatus 70, and, when it is determined that there is a file which is not allowed to be used among each of the files to be targets of use by the user, the file which is not allowed to be used is notified to the terminal apparatus 70.

When notification to the effect that each file is allowed to be used is received, the file use control unit 72 of the terminal apparatus 70 permits use of each file. When notification of a file which is not allowed to be used is received, the file use control unit 72 permits use of files besides the file which is not allowed to be used among each of the files to be targets of use by the user.

By such structure, an area in which a file is not allowed to be used can be set on a file-by-file basis.

Meanwhile, no smaller than two exemplary embodiments among each of the above-mentioned exemplary embodiments may be combined to be carried out.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An information management apparatus, comprising:
an existing zone area information acquisition unit which acquires existing zone area information which is a condition set for and written in each file and is information used for determination of whether a file is allowed to be used by being compared with a condition about an area where use of a file is allowed or forbidden;
a determining unit which determines whether each file to be a target of use by a user is allowed to be used by comparing the existing zone area information and each condition set for each file; and
a file use control unit which, upon being determined each of files to be targets of use by a user is allowed to be used, permits use of each of the files, and, upon being determined some of files to be targets of use by a user are not allowed to be used, permits use of files besides the file not allowed to be used.

2. The information management apparatus according to claim 1, further comprising:
a condition input unit which accepts input of a condition which is set for each file and is about areas where use of a file is allowed or forbid.

3. The information management apparatus according to claim 2, wherein:
information indicating an area to allow use of a file is inputted to the condition input unit, as the condition on a file-by-file basis;
the existing zone area information acquisition unit acquires location information of the information management apparatus itself as the existing zone area information; and
the determining unit compares the information indicating an area to allow use of a file and the location information of the information management apparatus itself.

4. The information management apparatus according to claim 2, wherein
identification information of a device designated by a user is inputted to the condition input unit, for each file as the condition; the existing zone area information acquisition unit acquires identification information of a device existing around the information management apparatus as the existing zone area information; and
the determining unit compares the identification information of a device inputted to the condition input unit for each file and the identification information of a device existing around the information management apparatus acquired by the existing zone area information acquisition unit.

5. The information management apparatus according to claim 4,
wherein identification information of a peer-to-peer device designated by a user is inputted to the condition input unit, for each file as the condition, and
wherein the existing zone area information acquisition unit acquires identification information of a peer-to-peer device existing around the information management apparatus as the existing zone area information.

6. The information management apparatus according to claim 4,
wherein identification information of a WLAN device designated by a user is inputted to the condition input unit, for each file as the condition, and
wherein the existing zone area information acquisition unit acquires identification information of a WLAN device existing around the information management apparatus as the existing zone area information.

7. The information management apparatus according to claim 1, wherein,
the file use control unit, upon being determined each of files to be targets of use by a user being allowed to be used, refers to file management information enumerating each of the files, and, upon being determined some of the files to be targets of use by a user are not allowed to be used, refers to file management information made by eliminating the file not allowed to be used from the files to be targets of use by a user, and permits use of files enumerated in file management information being referred to.

8. An information management system, comprising:
a terminal apparatus including a condition input unit for accepting, on a file-by-file basis, information indicating an area to allow use of a file as a condition to permit use of a file;
a database apparatus to receive the condition set for each file from the terminal apparatus and store the condition, wherein the database apparatus comprises:
a condition storage unit which stores the condition set for each file received from the terminal apparatus;
an existing zone area information acquisition unit which acquires location information of the terminal apparatus as existing zone area information used for determination of whether a file is allowed to be used by being compared with the condition;
a determining unit which determines whether each of files to be targets of use by a user is allowed to be used by comparing the existing zone area information and each condition set for and written in each of the files, and, upon being determined each of the files to be targets of use by a user is allowed to be used, notifying to that effect to the terminal apparatus, and, upon being determined some of the files to be targets of use by a user are not allowed to be used, notifying the terminal apparatus of the file not allowed to be used; and
wherein the terminal apparatus comprises:
a file use control unit which, upon receiving the notification to the effect that each of the files is allowed to be used, permits use of each of the files, and, upon receiving the notification of the file not allowed to be used, permits use of files besides the file not allowed to be used among files to be targets of use by a user.

9. An information management method, comprising the steps of:
  acquiring existing zone area information which is a condition set for and written in each file and being information used for determination of whether a file is allowed to be used by being compared with a condition about an area where use of a file is allowed or forbidden;
  determining whether each of files to be targets of use by a user is allowed to be used by comparing the existing zone area information and each condition set for each of the files; and,
  upon being determined each of the files to be targets of use by a user is allowed to be used, permitting use of each of the files, and, upon being determined some of the files to be targets of use by a user are not allowed to be used, permitting use of files besides the file not allowed to be used.

10. An information management program for making a computer execute the proceedings of:
  acquiring existing zone area information which is a condition set for and written in each file and is information used for determination of whether a file is allowed to be used by being compared with a condition about an area where use of a file is allowed or forbidden;
  determining whether each of files to be targets of use by a user is allowed to be used by comparing the existing zone area information and each condition set for each of the files; and
  upon being determined each of the files to be targets of use by a user is allowed to be used, permitting use of each of the files, and, upon being determined some of the files to be targets of use by a user are not allowed to be used, permitting use of files besides the file not allowed to be used.

* * * * *